United States Patent
Takayama et al.

(10) Patent No.: US 11,313,312 B2
(45) Date of Patent: Apr. 26, 2022

(54) ENGINE CONTROL METHOD AND ENGINE SYSTEM

(71) Applicant: MAZDA MOTOR CORPORATION, Hiroshima (JP)

(72) Inventors: Shinji Takayama, Fuchu-cho (JP); Takeatsu Ito, Fuchu-cho (JP); Masahiro Nagoshi, Fuchu-cho (JP); Yuichiro Akiya, Fuchu-cho (JP); Yuto Matsushima, Fuchu-cho (JP); Kenko Ujihara, Fuchu-cho (JP); Daisaku Ogawa, Fuchu-cho (JP); Daisuke Umetsu, Fuchu-cho (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/963,122

(22) PCT Filed: Jan. 16, 2019

(86) PCT No.: PCT/JP2019/001042
§ 371 (c)(1),
(2) Date: Jul. 17, 2020

(87) PCT Pub. No.: WO2019/146463
PCT Pub. Date: Aug. 1, 2019

(65) Prior Publication Data
US 2021/0047978 A1    Feb. 18, 2021

(30) Foreign Application Priority Data
Jan. 23, 2018   (JP) .............................. JP2018-009080

(51) Int. Cl.
*F02D 37/02*    (2006.01)
*F02D 41/30*    (2006.01)
(Continued)

(52) U.S. Cl.
CPC ..... *F02D 41/3041* (2013.01); *F02D 41/3035* (2013.01); *F02D 41/3064* (2013.01);
(Continued)

(58) Field of Classification Search
CPC .. F02D 37/02; F02D 41/3035; F02D 41/3041; F02D 41/3064; F02D 41/307;
(Continued)

(56) References Cited

U.S. PATENT DOCUMENTS

2001/0014845 A1 *   8/2001   Minowa ................. B60W 10/11
                                                    701/84
2012/0101691 A1 *   4/2012   Otsuka .................. F02D 11/105
                                                    701/48
(Continued)

FOREIGN PATENT DOCUMENTS

JP      2001073775 A    3/2001
JP      2014051928 A    3/2014
(Continued)

OTHER PUBLICATIONS

International Search Report issued in PCT/JP2019/001042; dated Mar. 19, 2019.
(Continued)

*Primary Examiner* — Erick R Solis
(74) *Attorney, Agent, or Firm* — Studebaker & Brackett PC

(57) ABSTRACT

A control unit performs a vehicle attitude control to reduce a torque generated by an engine when an increase in a steering angle exceeds a standard increase, and a spark ignition controlled compression ignition combustion in a predetermined operating range. In the spark ignition controlled compression ignition combustion, switching of an air-fuel ratio mode is performed between a first air-fuel ratio mode ($\lambda > 1$) is formed and a second air-fuel ratio mode (in
(Continued)

which a mixed gas of $\lambda \leq 1$) is formed. If the switching of the air-fuel ratio mode is requested without the vehicle attitude control, the control unit allows performing the requested switching of the air-fuel ratio mode. In contrast, if the mode switching is requested in a state where the vehicle attitude control is requested, the control unit disallows switching of the air-fuel ratio mode even when the switching of the air-fuel ratio mode is requested.

12 Claims, 21 Drawing Sheets

(51) Int. Cl.
    *F02D 41/40*     (2006.01)
    *F02D 41/00*     (2006.01)

(52) U.S. Cl.
    CPC .............. *F02D 41/40* (2013.01); *F02D 37/02* (2013.01); *F02D 41/0002* (2013.01); *F02D 41/0057* (2013.01); *F02D 2250/21* (2013.01); *F02D 2250/26* (2013.01)

(58) Field of Classification Search
    CPC ............. F02D 2250/18; F02D 2250/21; F02D 2250/26
    USPC ..................................................... 123/406.23
    See application file for complete search history.

(56) References Cited

U.S. PATENT DOCUMENTS

| | | |
|---|---|---|
| 2014/0283784 A1 | 9/2014 | Takahashi et al. |
| 2014/0283785 A1 | 9/2014 | Takahashi et al. |
| 2017/0058817 A1 | 3/2017 | Tsumura et al. |
| 2017/0254278 A1 | 9/2017 | Ohisa et al. |
| 2018/0345975 A1* | 12/2018 | Hiwatashi ....... B60W 30/18172 |
| 2019/0345890 A1 | 11/2019 | Ota et al. |

FOREIGN PATENT DOCUMENTS

| | | |
|---|---|---|
| JP | 2014-185622 A | 10/2014 |
| JP | 2014-185623 A | 10/2014 |
| JP | 2014-185624 A | 10/2014 |
| JP | 2017048738 A | 3/2017 |
| JP | 6112304 B2 | 4/2017 |
| JP | 2017155677 A | 9/2017 |
| JP | 6249084 B1 | 12/2017 |

OTHER PUBLICATIONS

An Office Action; "Notice of Reasons for Refusal", mailed by the Japanese Patent Office dated Jul. 13, 2021, which corresponds to Japanese Patent Application No. 2018-009080 and is related to U.S. Appl. No. 16/963,122; with English language translation.

\* cited by examiner

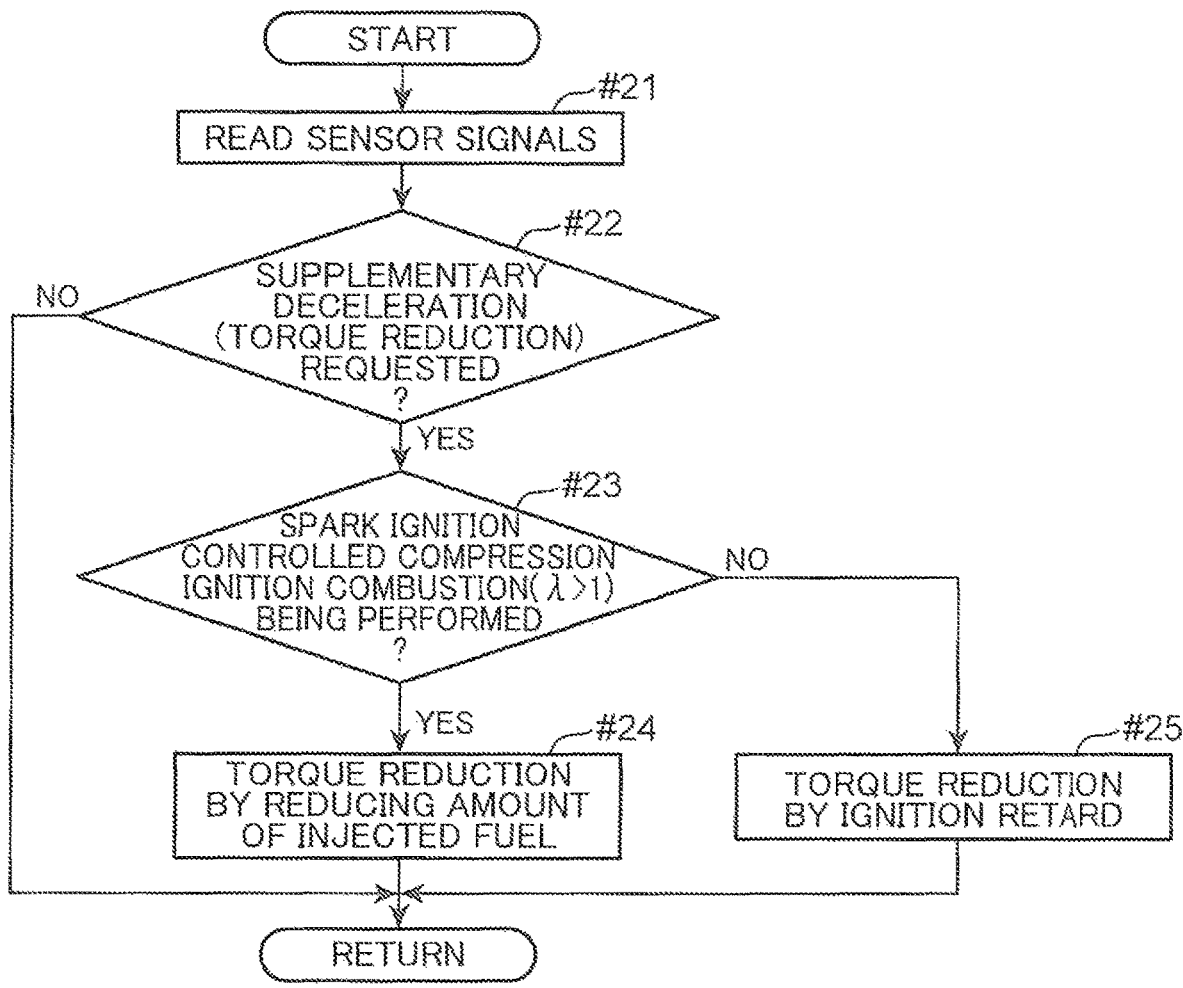

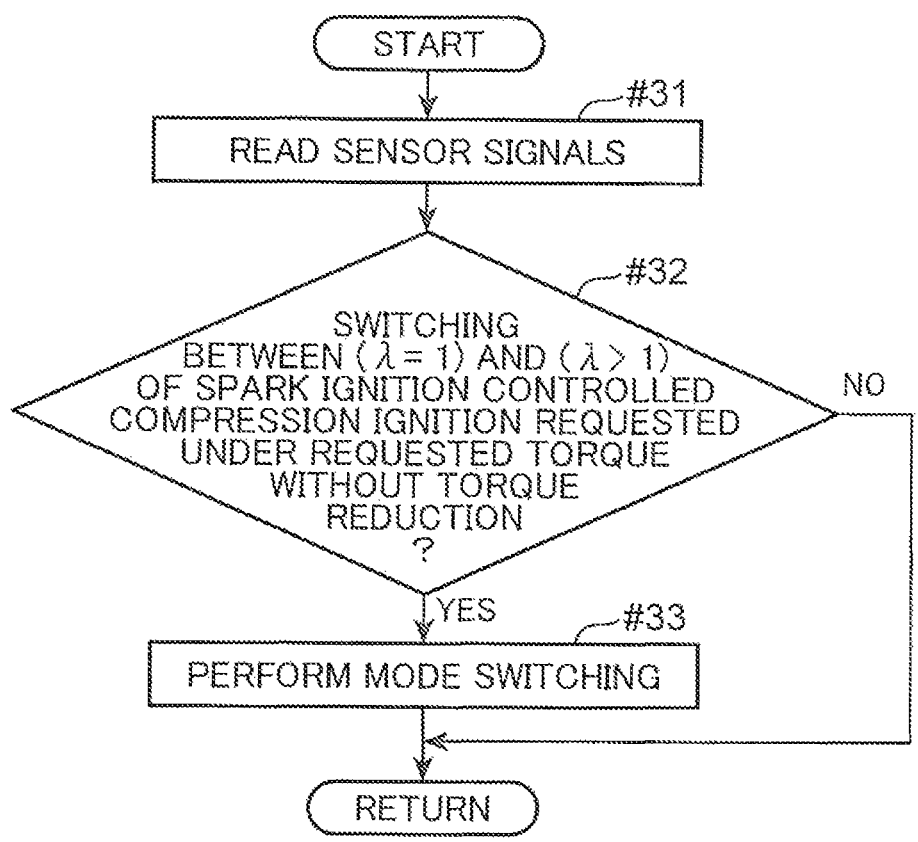

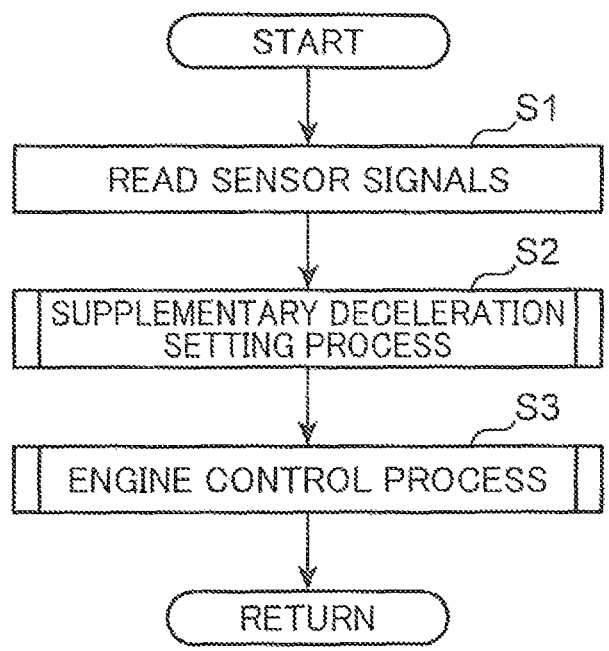

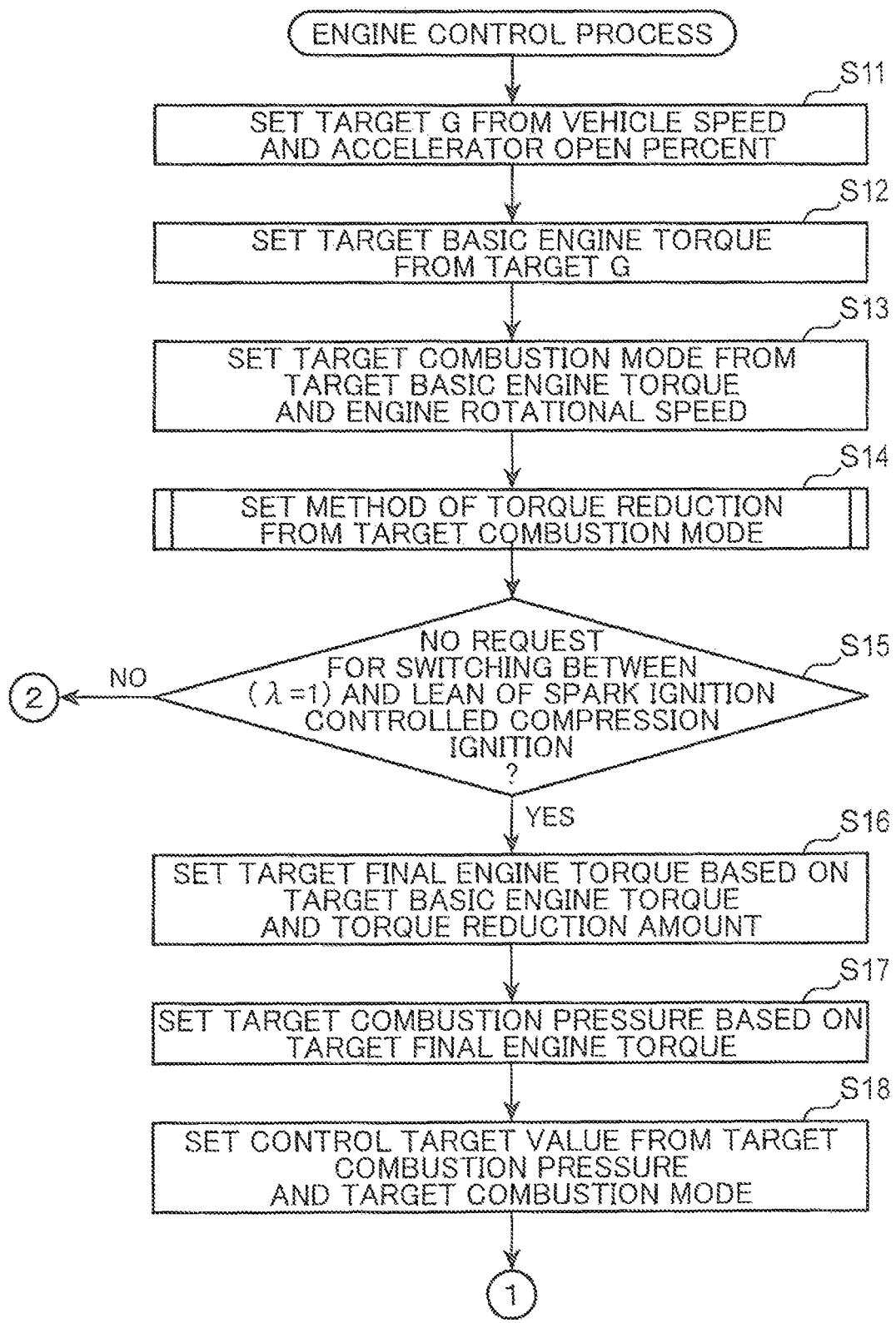

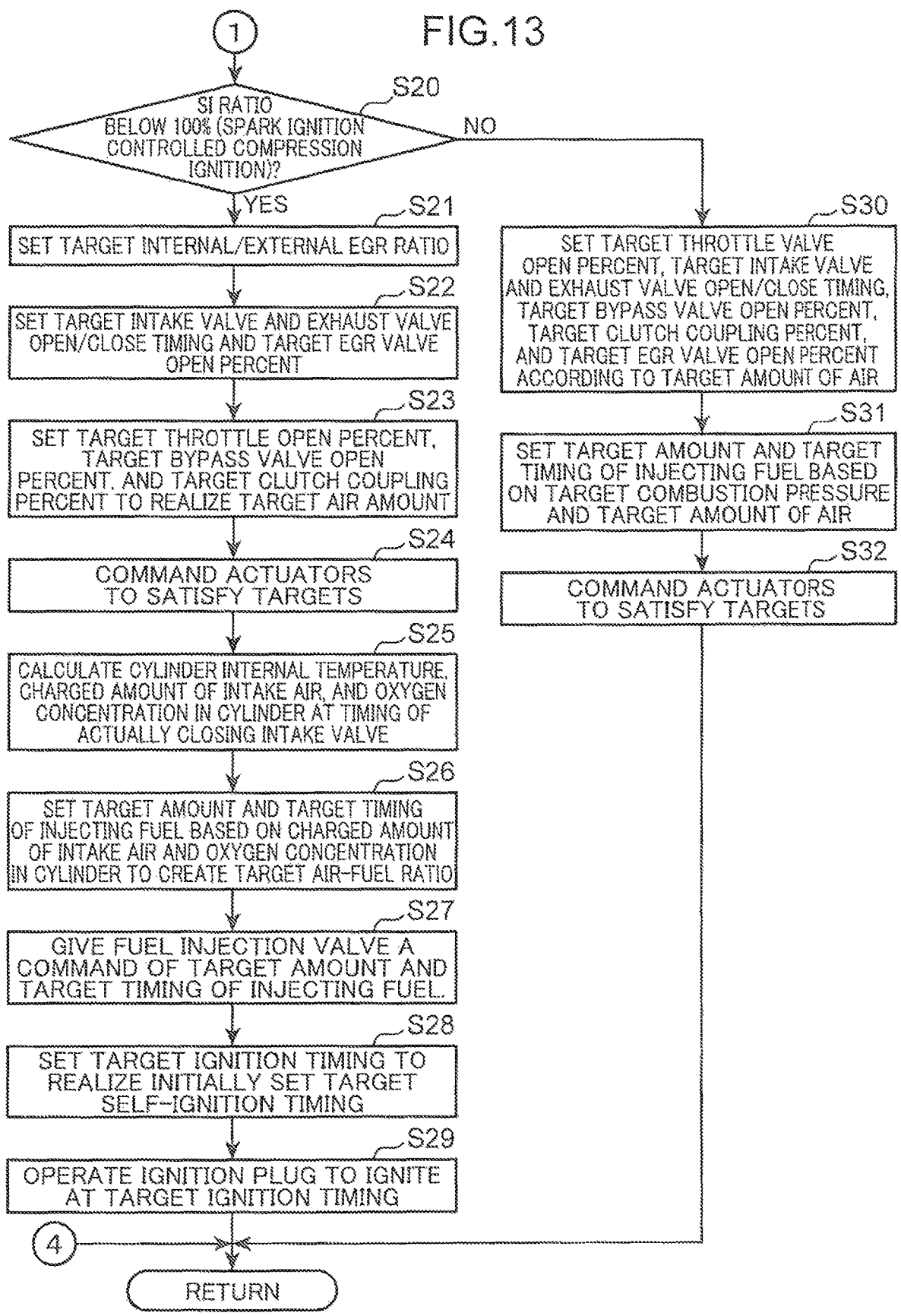

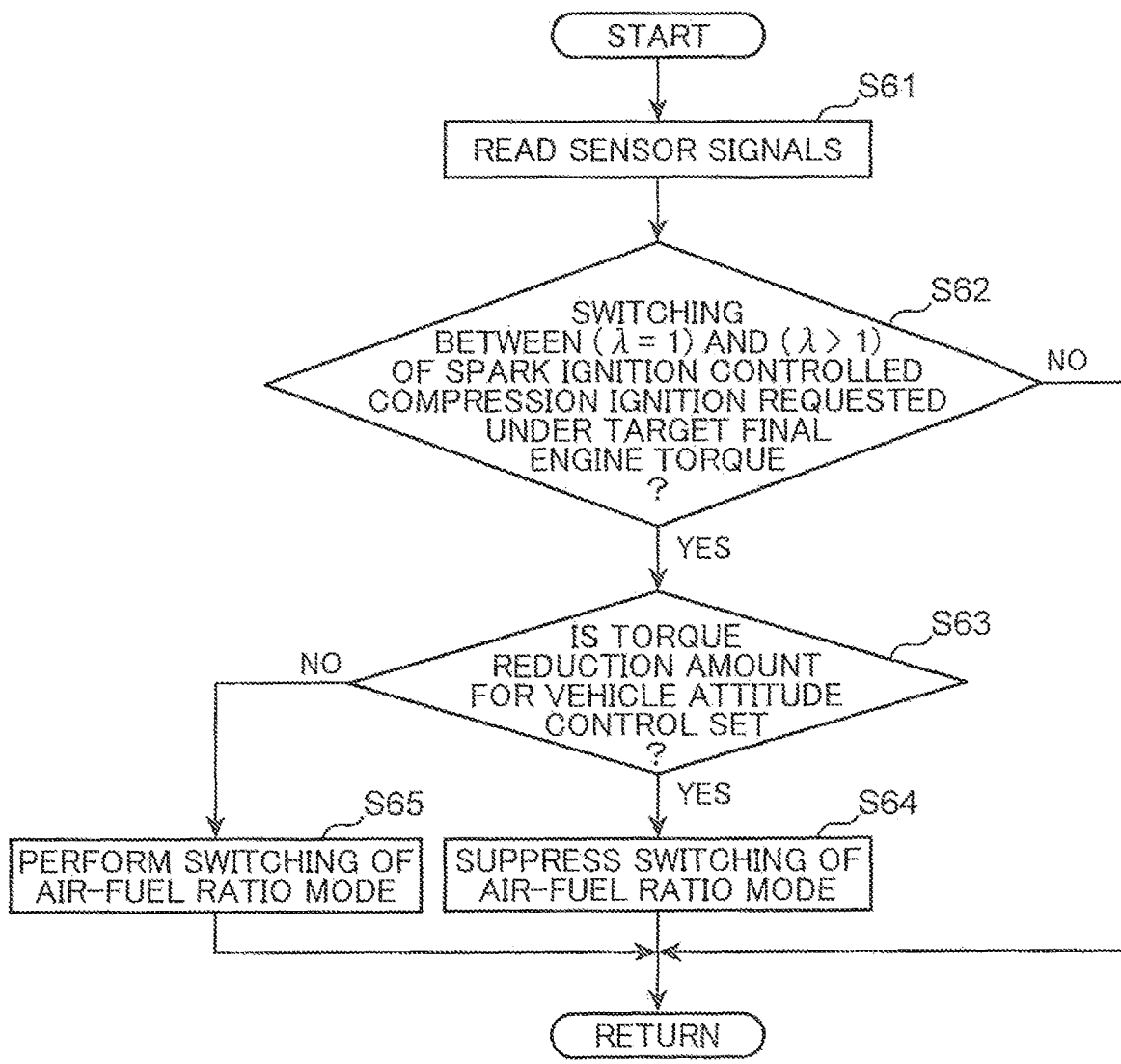

ENGINE CONTROL METHOD AND ENGINE SYSTEM

TECHNICAL FIELD

The present invention relates to an engine control method for an engine that combusts a portion of a mixed gas by spark ignition combustion (SI combustion) and a residual gas by self-ignited compression ignition combustion (CI combustion) and is capable of changing a generated torque according to a steering angle, and an engine system to which the control method is applied.

BACKGROUND ART

In a known premixed compression ignition combustion, a sufficiently compressed mixed gas of air and gasoline fuel is combusted by self-ignition in a cylinder. Also proposed is a partial compression ignition combustion (hereinafter also referred to as "spark ignition controlled compression ignition combustion" in the specification) in which spark ignition (SI) combustion and compression ignition (CI) combustion are combined instead of combusting the whole mixed gas by self-ignition (for example, see Patent Literature 1). In the spark ignition controlled compression ignition combustion, a spark ignition initiates forced combustion of a portion of the mixed gas by flame propagation (SI combustion) and the rest of the fresh mixed gas is combusted by self-ignition (CI combustion).

In some types of the spark ignition controlled compression ignition combustion, a first air-fuel ratio mode ($\lambda>1$) in which a mixed gas is leaner than a theoretical air-fuel ratio and a second air-fuel ratio mode ($\lambda=1$ or $\lambda<1$) in which the mixed gas is equal to or richer than the theoretical air-fuel ratio are used. The first air-fuel ratio mode in which the fuel is lean improves thermal efficiency of the engine. The second air-fuel ratio mode is used in a condition where combustion stability is prioritized. To operate an engine with the spark ignition controlled compression ignition combustion, it is desirable to timely perform mode switching between the first air-fuel ratio mode and the second air-fuel ratio mode according to conditions such as an engine load and a rotational speed.

Meanwhile, a drive assist control (hereinafter referred to as "vehicle attitude control" in the specification) in which a generated torque is changed according to a steering angle to integrally control accelerations (Gs) in the front-and-rear direction and the width direction of a vehicle is known (for example, see Patent Literature 2). When a driver starts turning a steering wheel under the vehicle attitude control, the torque generated by the engine is reduced to be smaller than a requested torque, and a resulting deceleration G causes load transfer to the front wheel. This increases the grip of the front wheel tire and increases a cornering force. In the vehicle attitude control, the reduction in the engine torque is performed by, for example, retarding the timing of igniting the mixed gas by an ignition plug (ignition retard).

There are needs of performing the vehicle attitude control on a vehicle with an engine that performs the spark ignition controlled compression ignition combustion. In a driving scene requiring relatively frequent changes in the steering angle like driving on a winding road, the vehicle attitude control is interposed in the engine control. When the vehicle attitude control is performed, a cycle of reducing the engine torque and returning the engine torque to the requested torque is repeated. Meanwhile, switching of the air-fuel ratio mode of the spark ignition controlled compression ignition combustion is perforated depending mainly on the engine load and the rotational speed. Thus, performing the vehicle attitude control might result in a frequent mode switching of the spark ignition controlled compression ignition combustion. In such a case, troubles of instable combustion may occur.

CITATION LIST

Patent Literature

Patent Literature 1: JP 2001-73775 A
Patent Literature 2: JP 6112304 B2

SUMMARY OF INVENTION

An object of the present invention is to provide an engine control method that can suppress happening of a frequent mode switching in an engine that performs both spark ignition controlled compression ignition combustion in which an air-fuel ratio mode of a mixed gas is switched between $\lambda>1$ and $\lambda\leq1$ and a vehicle attitude control, and an engine system to which the control method is applied.

An engine control method according to one aspect of the present invention is a method for controlling an engine that is mounted on a vehicle including a steering wheel and mechanically coupled to a driving wheel of the vehicle, and includes an ignition plug, the method including a step of setting combustion mode in which a combustion mode of the engine is selected among a first combustion mode and a second combustion mode based on an operating condition of the engine, the first combustion mode being a mode in which an entire mixed gas in a cylinder of the engine is combusted by propagating flame generated by the ignition plug, the second combustion mode being a mode in which at least a portion of the mixed gas in the cylinder is combusted by self-ignition, a step of setting air-fuel ratio mode in which, when the second combustion mode is selected in the step of setting combustion mode, an air-fuel ratio mode is selected among a first air-fuel ratio mode and a second air-fuel ratio mode based on the operating condition of the engine, the first air-fuel ratio mode being a mode in which the mixed gas is leaner than a theoretical air-fuel ratio, the second air-fuel ratio mode being a mode in which the mixed gas is equal to or richer than the theoretical air-fuel ratio, a switching step in which switching of the air-fuel ratio mode is performed based on the air-fuel ratio mode selected in the step of setting air-fuel ratio mode, a step of setting torque reduction in which a torque reduction amount by which a torque generated by the engine is reduced is set based on a steer angle of the steering wheel, and a suppressing step in which the switching of the air-fuel ratio mode caused by reducing the generated torque is suppressed when the torque reduction amount is set in the step of setting torque reduction.

An engine system according to another aspect of the present invention includes an engine that is mounted on a vehicle including a steering wheel and mechanically coupled to a driving wheel of the vehicle, and includes an ignition plug, an operating condition sensor that detects an operating condition of the engine, a steer angle sensor that detects a steer angle of the steering wheel; and a control unit. The control unit selects a combustion mode of the engine among a first combustion mode and a second combustion mode based on a detected result by the operating condition sensor, the first combustion mode being a mode in which an entire mixed gas in a cylinder of the engine is combusted by propagating flame generated by the ignition plug, the second combustion mode being a mode in which at least a portion of the mixed gas in the cylinder is combusted by self-ignition in the second air-fuel ratio mode, selects an air-fuel ratio mode, when the second combustion mode is selected as the combustion mode of the engine, among a first air-fuel ratio mode and a second air-fuel ratio mode based on the operating condition of the engine, the first air-fuel ratio mode being a mode in which the mixed gas is leaner than a theoretical air-fuel ratio, the second air-fuel ratio mode being a mode in which the mixed gas is equal to or richer than the theoretical air-fuel ratio, switches the air-fuel ratio mode based on the selected air-fuel ratio mode, sets a torque reduction amount by which a torque generated by the engine is reduced based on a detected result by the steer angle sensor, and suppresses, when the torque reduction amount is set, switching of the air-fuel ratio mode caused by reducing the generated torque.

BRIEF DESCRIPTION OF DRAWINGS

FIG. 10B is a flowchart illustrating another exemplary process of setting a method of torque reduction.

FIG. 10C is a flowchart schematically illustrating an example of the engine control method according to the present invention.

FIG. 11 is a flowchart illustrating a basic operation of the engine control method according to an embodiment of the present invention.

FIG. 12 is a flowchart illustrating a detail on an engine controlling process.

FIG. 13 is a flowchart illustrating a detail on the engine controlling process.

FIG. 19 is a flowchart schematically illustrating an exemplary modification of the engine control method according to the present invention.

DESCRIPTION OF EMBODIMENTS

[Vehicle Structure]

Figure 1:
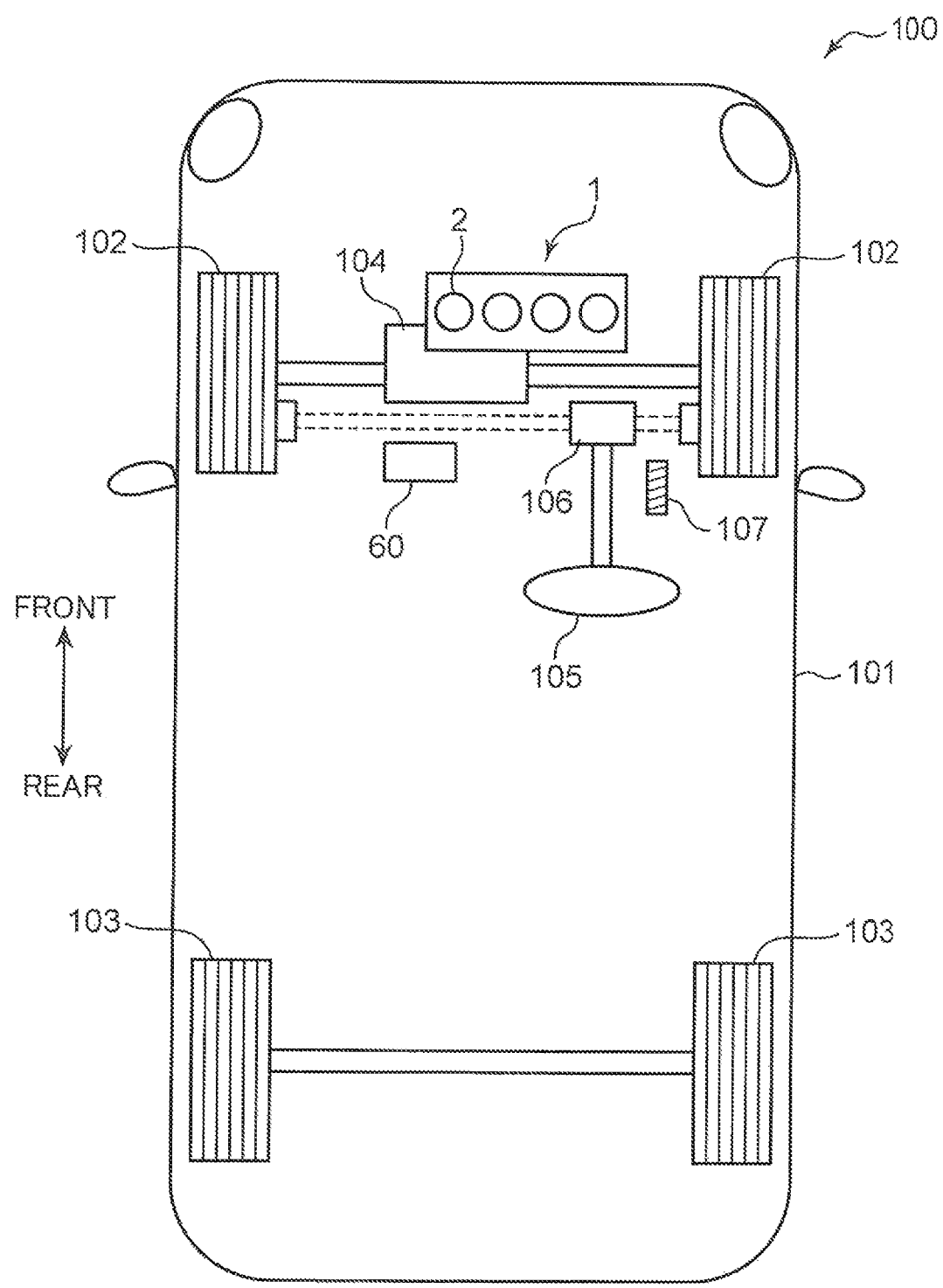
FIG. 1 is a schematic view of a vehicle to which an engine control method and an engine system according to the present invention is applied.

An embodiment of the present invention will now be described below in detail based on the drawings. With reference to FIG. 1, an engine control method according to the present invention and a structure of a vehicle 100 to which an engine system is applied will schematically be described. The vehicle 100 according to the embodiment is an FF vehicle including an engine body 1 as a driving source. The engine body 1 is a straight-four-cylinder gasoline engine including four cylinders 2 and configured to perform SI combustion and spark ignition controlled compression ignition combustion.

The vehicle 100 includes a vehicle body 101 on which the engine body 1 is mounted, a front wheels 102 serving as driving and steering wheels, and rear wheels 103 serving as driven wheels. The driving power generated by the engine body 1 is transmitted to the front wheels 102 via a transmission 104. The vehicle 100 is provided with a steering 105 for steering the front wheels 102, and a power steering device 106 for assisting manipulation of the steering 105. The vehicle 100 includes an accelerator 107 controlled by a driver to adjust an open percent of a throttle valve 32 which will be described later.

An ECU 60 (control unit) that performs electronic control on the engine body 1 is mounted on the vehicle 100. The ECU 60 according to the embodiment is configured to perform a vehicle attitude control when the driver manipulates the steering 105. When the driver starts turning the steering 105 under the vehicle attitude control, the torque generated by the engine body 1 is reduced to a value below a requested torque determined by the open percent of the accelerator 107, for example, and a resulting deceleration G causes load transfer to the front wheels 102. This increases the grip of tires of the front wheels 102 and increases a cornering force. The vehicle attitude control and the spark ignition controlled compression ignition combustion described above will be described later.

[Engine System]

Figure 2:
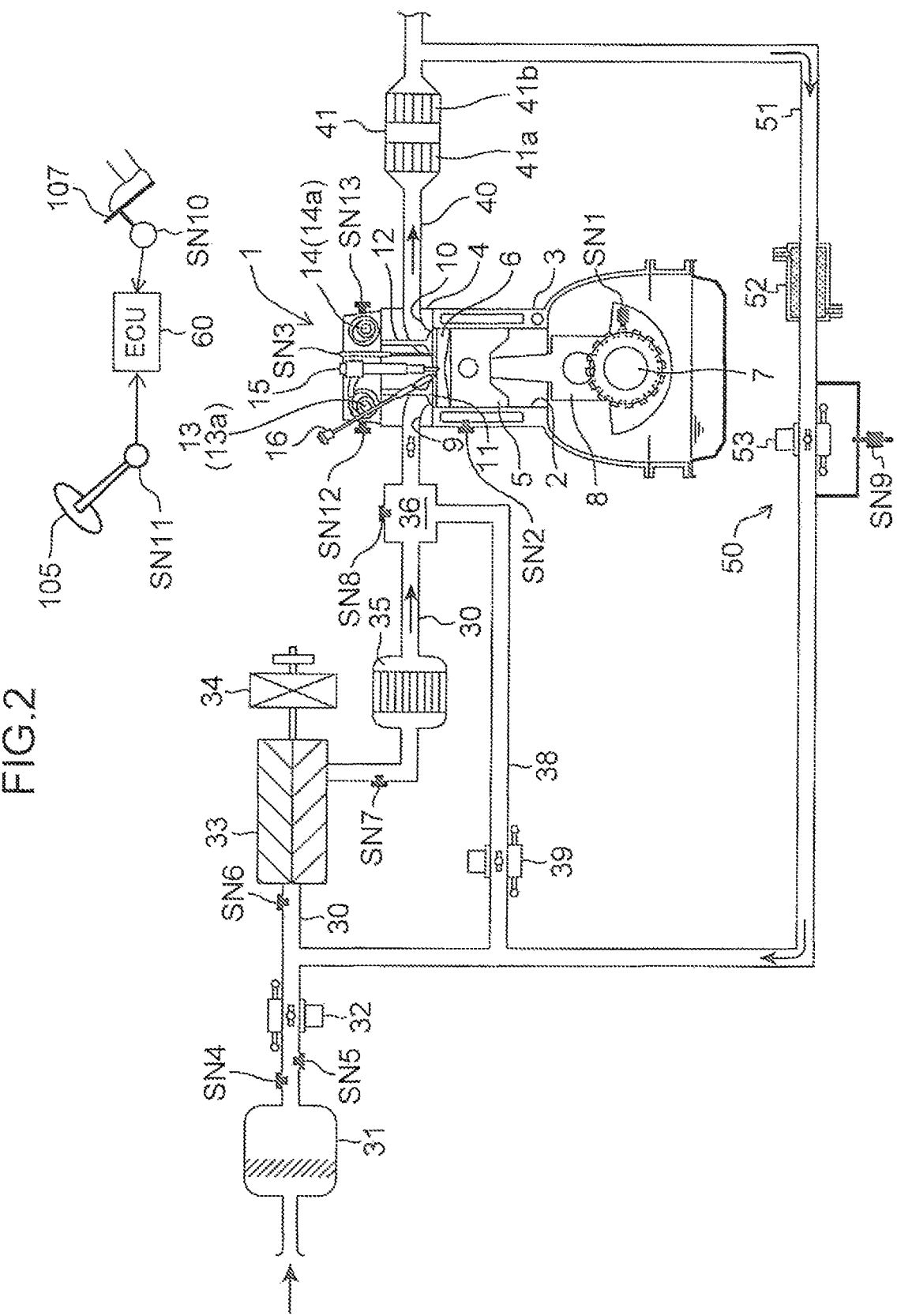
FIG. 2 is a system diagram illustrating a general configuration of a compression ignition engine to which the present invention is applied.

An engine system mounted on the vehicle 100 will now be described. FIG. 2 is a general configuration of the engine system according to the embodiment. The engine system includes the engine body 1, which is a four-cycle direct injection gasoline engine, an intake passage 30 in which an intake air introduced to the engine body 1 flows, an exhaust passage 40 in which an exhaust gas discharged from the engine body 1 flows, and an EGR device 50 that flow backs a portion of the exhaust gas, flowing in the exhaust passage 40, to the intake passage 30.

The engine body 1 is used as a driving source of the vehicle 100. The engine body 1 of the embodiment is an engine driven by a supplied fuel mainly composed of gasoline. The fuel may be a gasoline including bioethanol. The engine body 1 includes a cylinder block 3, a cylinder head 4, and pistons 5. The cylinder block 3 includes a cylinder liner forming the four cylinders 2. The cylinder head 4 is attached to a top face of the cylinder block 3 to close an upper opening of the cylinders 2. The piston 5 is housed in each cylinder 2 to reciprocate and is connected to a crank shaft 7 via a connecting rod 8. As the pistons 5 reciprocate, the crank shaft 7 is rotated about its central axis.

A combustion chamber 6 is provided above the piston 5. The fuel is injected from an injector 15, which will be described later, to be supplied into the combustion chamber 6. A mixed gas of the supplied fuel and air is combusted in the combustion chamber 6. The expanding force generated by the combustion pushes down the piston 5 and the piston 5 reciprocates along the up-and-down direction. A geometric compression ratio of the cylinder 2, that is, a ratio of a volume of the combustion chamber 6 when the piston 5 is at a top dead center to a volume of the combustion chamber 6 when the piston 5 is at a bottom dead point, is set to a high compression ratio from 13 to 30 (inclusive) (for example, about 20) which is suitable for the spark ignition controlled compression ignition combustion described later.

A crank angle sensor SN1 and a water temperature sensor SN2 are attached to the cylinder block 3. The crank angle sensor SN1 detects a rotational angle (crank angle) and a rotational speed (engine rotational speed) of the crank shaft 7. The water temperature sensor SN2 detects a temperature of cooling water (engine water temperature) that flows inside the cylinder block 3 and the cylinder head 4.

The cylinder head 4 is provided with an intake port 9 and an exhaust port 10 which communicate with the combustion chamber 6. A bottom face of the cylinder head 4 serves as a ceiling face of the combustion chamber 6. The combustion chamber ceiling face is provided with an intake opening located in a downstream end of the intake port 9, and an exhaust opening located in an upstream end of the exhaust port 10. An intake valve 11 that opens and closes the intake opening and an exhaust valve 12 that opens and closes the exhaust opening are assembled to the cylinder head 4. Although not illustrated in the drawings, the engine body 1 is provided with four valves, that is, two intake valves and two exhaust valves. Each of the cylinders 2 is provided with two intake ports 9 and two exhaust ports 10 as well as two intake valves 11 and two exhaust valves 12.

The cylinder head 4 is provided with an intake valve mechanism 13 and an exhaust valve mechanism 14 each including a camshaft. The intake valve 11 and the exhaust valve 12 are driven to open and close by the valve mechanisms 13 and 14 in conjunction with rotation of the crank shaft 7. The intake valve mechanism 13 includes an intake VVT 13a that changes at least the open timing of the intake valve 11. Similarly, the exhaust valve mechanism 14 includes an exhaust VVT 14a that changes at least a close timing of the exhaust valve 12. By controlling the intake VVT 13a and the exhaust VVT 14a, a valve overlap period in which both the intake valve 11 and exhaust valve 12 are opened before and after the timing when the piston 5 passes the exhaust top dead center can be adjusted. By adjusting the valve overlap period, an amount of combusted gas (internal EGR gas) remaining in the combustion chamber 6 can be adjusted.

The injector 15 (fuel injection valve) and an ignition plug 16 are also attached to the cylinder head 4. The injector 15 jets (supplies) fuel in the cylinder 2 (combustion chamber 6). A multi-jet-hole injector configured to radially jet fuel from a plurality of injection holes in a distal end portion can be used as the injector 15. The injector 15 is disposed with the distal end portion exposed in the combustion chamber 6 to be directed to a radially central portion of a crown face of the piston 5.

The ignition plug 16 is disposed at a location shifted to the intake side from the injector 15 by some degree with the distal end portion (electrode) directed to the cylinder 2. The ignition plug 16 serves as a forced ignition source that ignites the mixed gas of fuel and air formed in the cylinder 2 (combustion chamber 6).

The cylinder head 4 is provided with a cylinder internal pressure sensor SN3, an intake cam angle sensor SN12, and an exhaust cam angle sensor SN13 serving as sensing components. The cylinder internal pressure sensor SN3 detects the pressure in the combustion chamber 6. The intake cam angle sensor SN12 detects a camshaft rotational position of the intake valve mechanism 13. The exhaust cam angle sensor SN13 detects a camshaft rotational position of the exhaust valve mechanism 14.

As illustrated in FIG. 2, the intake passage 30 is connected to a side face of the cylinder head 4 and communicates with the intake port 9. The air (fresh air) taken in from the upstream end of the intake passage 30 is introduced into the combustion chamber 6 via the intake passage 30 and the intake port 9. An air cleaner 31, the throttle valve 32, a supercharger 33, an electromagnetic clutch 34, an intercooler 35, and a surge tank 36 are provided on the intake passage 30 in this order from the upstream side.

The air cleaner 31 cleans the intake air by removing foreign matter from the intake air. The throttle valve 32 opens and closes the intake passage 30 in conjunction with a push-action given to the accelerator 107 to adjust the amount of intake air flowing in the intake passage 30. The supercharger 33 pressurizes the intake air and sends out the intake air to the downstream of the intake passage 30. The supercharger 33 is mechanically coupled to the engine body 1. The electromagnetic clutch 34 switches coupling and decoupling between the supercharger 33 and the engine body 1. When coupling is made by the electromagnetic clutch 34, the driving power is transmitted from the engine body 1 to the supercharger 33 to perform supercharging on the supercharger 33. The intercooler 35 cools the intake air pressurized by the supercharger 33. The surge tank 36 is disposed in a direct upstream of the intake manifold (not shown) and has a space to evenly distribute the intake air to a plurality of the cylinders 2.

An airflow sensor SN4 that detects a flow amount of the intake air, first and second intake air temperature sensors SN5 and SN7 that detect intake air temperatures, and first and second intake air pressure sensors SN6 and SN8 that detect intake air pressures are provided to portions of the intake passage 30. The airflow sensor SN4 and the first intake air temperature sensor SN5 are provided to a portion of the intake passage 30 between the air cleaner 31 and the throttle valve 32 to respectively detect the flow amount and the temperature of the intake air passing the portion. The first intake air pressure sensor SN6 is provided to a portion of the intake passage 30 between the throttle valve 32 and the supercharger 33 (in the downstream of a joint to an EGR passage 51, which will be described later) to detect the pressure of the intake air passing the portion. The second intake air temperature sensor SN7 is provided to a portion of the intake passage 30 between the supercharger 33 and the intercooler 35 to detect the temperature of the intake air passing the portion. The second intake air pressure sensor SN8 is provided to the surge tank 36 to detect the pressure of the intake air in the surge tank 36.

The intake passage 30 is provided with a bypass passage 38 for sending the intake air to the combustion chamber 6, bypassing the supercharger 33. The bypass passage 38 connects between the surge tank 36 and a downstream section of the EGR passage 51, which will be described later. A bypass valve 39 that opens and closes the bypass passage 38 is provided on the bypass passage 38.

The exhaust passage 40 is connected to another side face of the cylinder head 4 and communicates with the exhaust port 10. The combusted gas (exhaust gas) produced in the combustion chamber 6 is discharged out of the vehicle 100 through the exhaust port 10 and the exhaust passage 40. A catalytic converter 41 is provided on the exhaust passage 40. The catalytic converter 41 houses a three-way catalyst 41a for removing hazardous components (HC, CO, and NOx) from the exhaust gas passing the exhaust passage 40, and a gasoline particulate filter (GPF) 41b for catching particulate matter (PM) in the exhaust gas.

The EGR device 50 includes the EGR passage 51 connecting between the exhaust passage 40 and the intake passage 30, an EGR cooler 52, and an EGR valve 53, where the EGR cooler 52 and the EGR valve 53 are provided on the EGR passage 51. The EGR passage 51 connects between a portion of the exhaust passage 40 further in the downstream of the catalytic converter 41 and a portion of the intake passage 30 between the throttle valve 32 and the supercharger 33. The EGR cooler 52 cools by heat exchange the exhaust gas (external EGR gas) flowing back from the exhaust passage 40 to the intake passage 30 through the EGR passage 51. The EGR valve 53 is provided further in the downstream than the EGR cooler 52 on the EGR passage 51. The EGR valve 53 is opened and closed to adjust the amount of the exhaust gas flowing in the EGR passage 51. A differential pressure sensor SN9 for detecting a differential pressure between the upstream and the downstream of the EGR valve 53 is provided on the EGR passage 51.

An accelerator open percent sensor SN10 (one of operating condition sensors) that detects an accelerator open percent is provided to the accelerator 107. The accelerator open percent sensor SN10 detects not only the push-in position of the accelerator 107 but deceleration and acceleration of the driver. A steering angle sensor SN11 (steer angle sensor) is provided to the steering 105. The steering angle sensor SN11 detects a steering angle of the front wheels 102 given by the steering 105. Other types of steer angle sensor that are detectable of the steer angle of the front wheels 102 may be used.

[Control Configuration]

Figure 3:
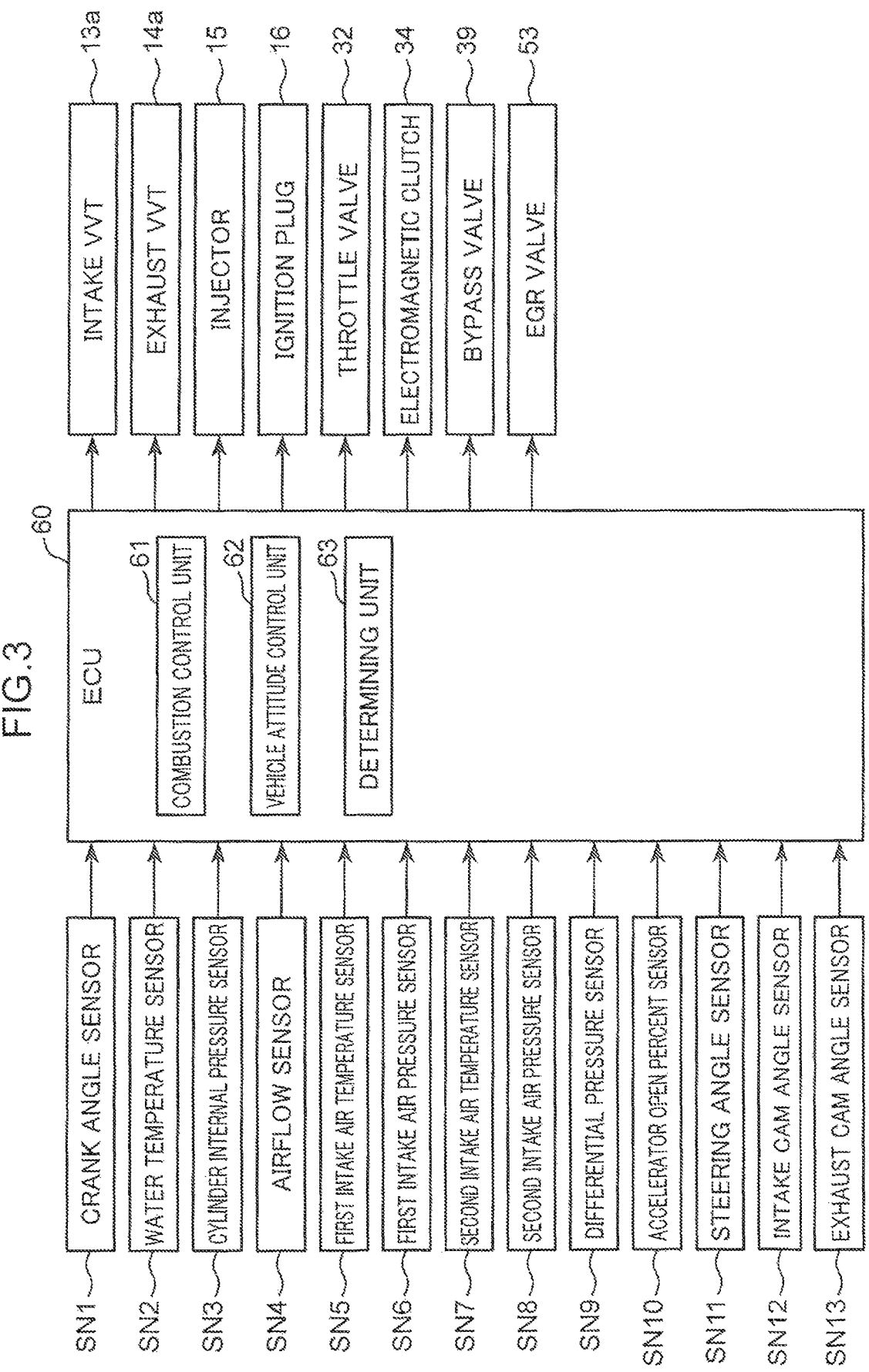
FIG. 3 is a block diagram illustrating a control system of the compression ignition engine.

FIG. 3 is a block diagram illustrating a control configuration of the engine system. The engine system according to the embodiment is integrally controlled by an ECU (engine control module) 60. The ECU 60 is a microprocessor including a CPU, a ROM, or a RAM.

Detected signals from the sensors provided in the vehicle 100 are input to the ECU 60. The ECU 60 is electrically connected to the sensors described above, that is, the crank angle sensor SN1, the water temperature sensor SN2, the cylinder internal pressure sensor SN3, the airflow sensor SN4, the first and second intake air temperature sensors SN5 and SN7, the first and second intake air pressure sensors SN6 and SN5, the differential pressure sensor SN9, the accelerator open percent sensor SN10, the steering angle sensor SN11, the intake cam angle sensor SN12, and the exhaust cam angle sensor SN13. Pieces of information detected by the sensors SN1 to SN13 are input to the ECU 60, where the information includes the crank angle, the engine rotational speed, the engine water temperature, the cylinder internal pressure, the flow amount of intake air, the intake air temperature, the intake air pressure, the differential pressure between upstream and downstream of the EGR valve 53, the accelerator open percent, the steering angle, the intake cam angle, and the exhaust cam angle.

Based on input signals from the sensors SN1 to SN13, the ECU 60 performs determinations and calculations to control the parts of the engine. That is, the ECU 60 is electrically connected to the components including the intake VVT 13a, the exhaust VVT 14a, the injector 15, the ignition plug 16, the throttle valve 32, the electromagnetic clutch 34, the bypass valve 39, and the EGR valve 53 and outputs control signals to the components based on, for example, the result of the calculation.

Figure 4:
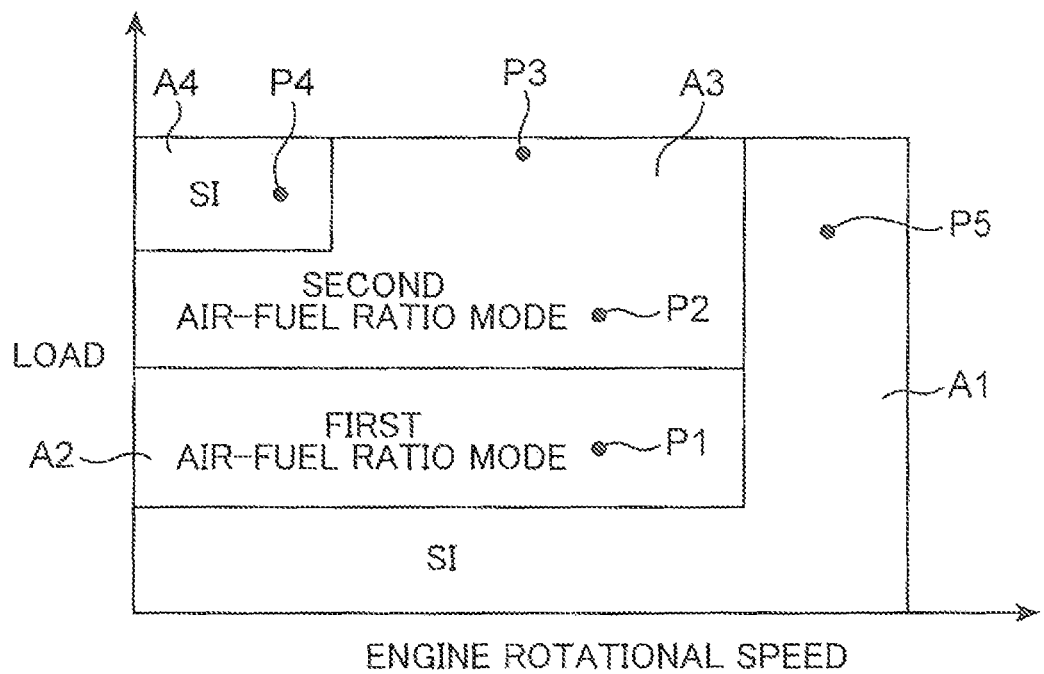
FIG. 4 is an operation map for explaining different combustion controls with reference to a rotational speed and a load of the engine.

The ECU 60 includes a combustion control unit 61, a vehicle attitude control unit 62, and a determining unit 63 as functional units. The combustion control unit 61 controls fuel injection performed by the injector 15 and ignition performed by the ignition plug 16. For example, the combustion control unit 61 determines an amount of fuel jetted from the injector 15, a timing of jetting the fuel from the injector 15, and an ignition timing of the ignition plug 16 based on the engine rotational speed detected by the crank angle sensor SN1, the engine load (requested torque) specified by the open percent of the accelerator 107 detected by the accelerator open percent sensor SN10, and the flow amount of intake air detected by the airflow sensor SN4 and operates the injector 15 and the ignition plug 16 according to the determination. In this process, the combustion control unit 61 refers to a predetermined operation map (of which example is illustrated in FIG. 4) and selects a combustion mode. As will be described later, the combustion mode includes a combustion mode in which the injector 15 and the ignition plug 16 are operated to cause self-ignition of the mixed gas in the cylinder 2 at a predetermined timing (spark ignition controlled compression ignition combustion).

The vehicle attitude control unit 62 performs vehicle attitude control to change a torque generated by the engine body 1 according to the steering angle of the front wheels 102 given by the steering 105 (step of setting torque reduction). The vehicle attitude control unit 62 refers to a value detected by the steering angle sensor SN11, for example, and determines that the vehicle 100 is in a turning (cornering) state if the steering angle has increased by a predetermined value within a predetermined time period, and performs a control to reduce the generated torque. The method of reducing the torque is not particularly limited. The embodiment employs either a retard control in which the timing of ignition (operation) of the ignition plug 16 is retarded or an amount decreasing control in which the amount of fuel supplied into the cylinder 2 is decreased according to the operating mode, for example. For a larger torque reduction amount for the vehicle attitude control, the vehicle attitude control unit 62 performs a control of retarding the ignition timing by a larger degree or a control of decreasing the amount of injected fuel by a larger amount.

The determining unit 63 determines whether there may be a chance of combustion becoming instable or misfire (instable combustion) in the combustion chamber 6. In the embodiment, the combustion control including the spark ignition controlled compression ignition combustion performed by the combustion control unit 61 and the vehicle attitude control performed by the vehicle attitude control unit 62 overlap. Performing both the controls overlapping each other under a certain condition may cause the instable combustion. When the determining unit 63 determines that the instable combustion may occur, the determining unit 63 performs a control of changing a form of combustion control or a form of the vehicle attitude control.

In the embodiment, as will be described later, the air-fuel ratio mode of the spark ignition controlled compression ignition combustion is switched, according to the operating condition, between a first air-fuel ratio mode ($\lambda>1$) in which the air-fuel ratio is leaner than a theoretical air-fuel ratio and a second air-fuel ratio mode (λ≤1) in which the air-fuel ratio is equal to or richer than the theoretical air-fuel ratio (step of setting air-fuel ratio mode and switching step). When the vehicle attitude control is performed, a cycle of reducing the engine torque and returning the engine torque to the requested torque is repeated, and the mode switching of the spark ignition controlled compression ignition combustion is performed depending mainly on the engine load and the rotational speed. Thus, performing the vehicle attitude control might cause hunting in which the mode switching of the spark ignition controlled compression ignition combustion frequently happens. From this point of view, when the vehicle attitude control is being performed, the determining unit 63 commands the combustion control unit 61 or the vehicle attitude control unit 62 to suppress switching of the air-fuel ratio mode of the spark ignition controlled compression ignition combustion even if the condition for the switching the air-fuel ratio mode is satisfied (suppressing step).

[Combustion Control]

Combustion control performed by the combustion control unit 61 will now be described in detail. FIG. 4 is a simplified operation map for explaining differences in combustion control for different rotational speeds and loads of the engine. Illustrated in the operation map are four operating regions: a first region A1, a second region A2, a third region A3, and a fourth region A4. The first region A1 has an area where the engine rotational speed is in a low or middle range with a low engine load (including no load) and an area where the engine rotational speed is in a high range with a middle or high load. The second region A2 is where the speed is in a low or middle range with a load higher than the load in the first region A1 (low and middle speed range with middle load). The third region A3 is where the speed is in a low or middle range with a load higher than the load in the second region A2 (low and middle speed range with high load). The fourth region A4 is where the speed is in a low range with a load close to a maximum load line.

SI combustion (first combustion mode) is performed in the first region A1 and the fourth region A4. In the SI combustion, the mixed gas in the combustion chamber 6 is ignited by a spark ignition using the ignition plug 16, and a flame propagates from the ignition point to expand the combustion region, thereby forcibly combusting the mixed gas. In this combustion mode, the whole mixed gas in the cylinder 2 is combusted by the propagating flame produced by the ignition plug 16.

The spark ignition controlled compression ignition combustion (second combustion mode) is performed in the second region A2 and the third region A3. The spark ignition controlled compression ignition combustion is a combined combustion of the SI combustion and the CI combustion. In the CI combustion, the mixed gas is combusted by self-ignition under a high temperature and high pressure environment created by compression by the piston 5. In the spark ignition controlled compression ignition combustion, a portion of the mixed gas in the combustion chamber 6 is combusted by SI combustion initiated by the spark ignition performed under an environment where the mixed gas almost self-ignites, and then after the SI combustion, the rest of the mixed gas in the combustion chamber 6 is combusted by CI combustion initiated by self-ignition (under a higher temperature with a higher pressure produced by the SI combustion). At least a portion of the mixed gas in the cylinder 2 is combusted by self-ignition in this combustion mode.

In the embodiment, the spark ignition controlled compression ignition combustion includes the first air-fuel ratio mode (λ>1) in which the air-fuel ratio of the mixed gas formed in the combustion chamber 6 is leaner than the theoretical air-fuel ratio and the second air-fuel ratio mode (λ≤1) in which the air-fuel ratio of the mixed gas is equal to or richer than the theoretical air-fuel ratio. In more detail, the spark ignition controlled compression ignition combustion is performed in the first air-fuel ratio mode with an air-fuel ratio (A/F), which is a weight ratio of the air (fresh air) to the fuel in the combustion chamber 6, set to a value larger than the theoretical air-fuel ratio (14.7). Meanwhile, the spark ignition controlled compression ignition combustion is performed in the second air-fuel ratio mode with the air-fuel ratio set to the theoretical air-fuel ratio (λ=1) or near the theoretical air-fuel ratio (λ<1). In the embodiment, the air-fuel ratio A/F of the mixed gas formed in the first air-fuel ratio mode is set within a range from 25/1 to 30/1 (first air-fuel ratio range). The air-fuel ratio A/F in the second air-fuel ratio mode is unquestionably λ=1, namely, 14.7/1 (second air-fuel ratio range). Either the first air-fuel ratio mode (λ>1) or the second air-fuel ratio mode (λ≤1) is selected based on an operating condition of the engine in the spark ignition controlled compression ignition combustion (step of setting air-fuel ratio mode).

Figure 5:
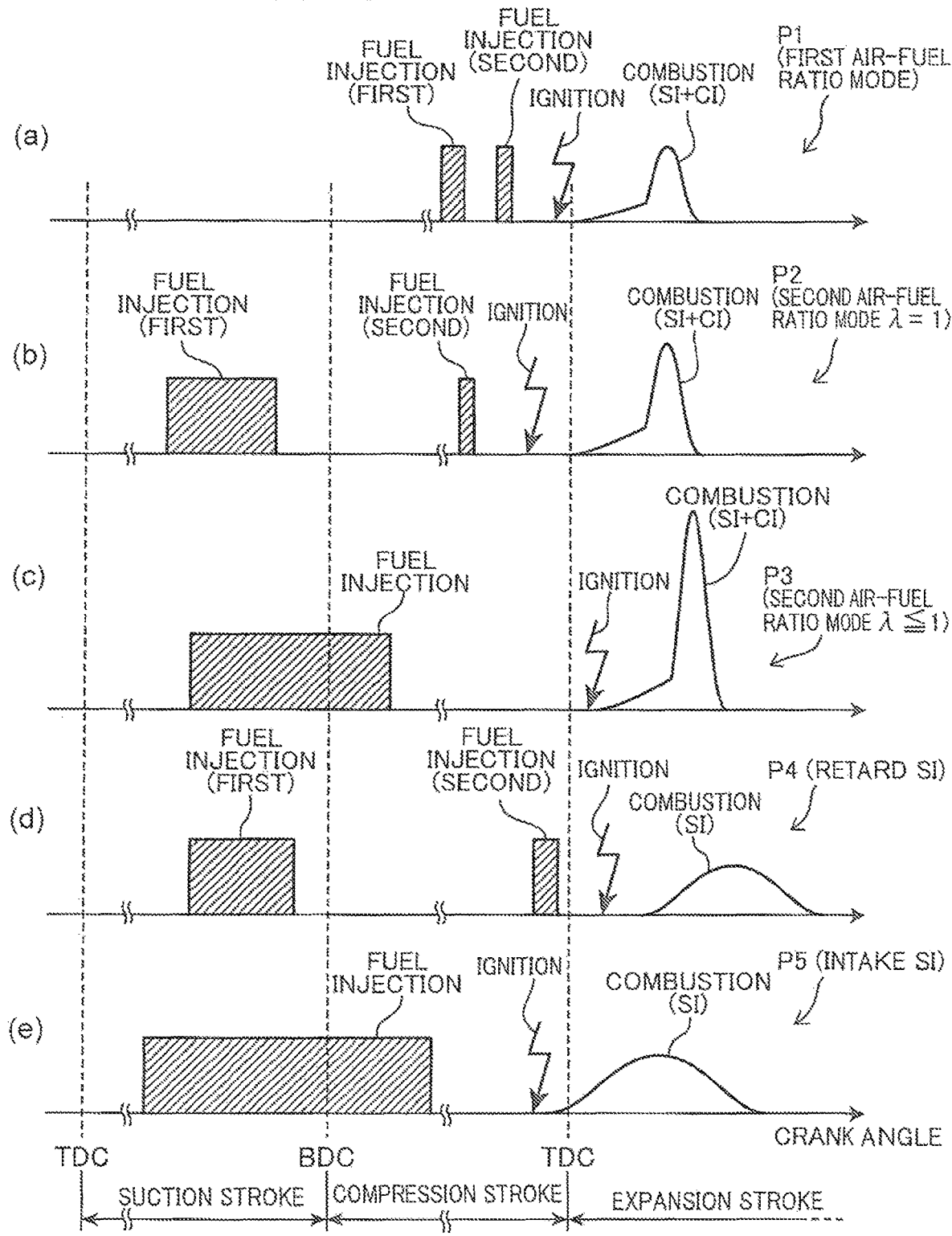
FIG. 5 is a timing chart for schematically explaining the combustion control performed in each region in the operation map in FIG. 4.

FIG. 5 is a timing chart for schematically explaining the combustion control performed in the regions A1 to A4 in the operation map in FIG. 4. Chart (a) in FIG. 5 illustrates a timing of fuel injection, an ignition timing, and a form of combustion (waveform of heat generation rate) when the engine is running at an operation point P1 in the second region A2 illustrated in FIG. 4. In the second region A2, the spark ignition controlled compression ignition combustion is performed in the first air-fuel ratio mode (λ>1).

The combustion control performed by the combustion control unit 61 at the operation point P1 is described below. As illustrated in the chart (a), the injector 15 jets fuel two times, that is, fuel injection (first) and fuel injection (second) from a middle phase to a later phase of a compression stroke. The ignition plug 16 ignites the mixed gas at a timing near but in the advanced side from the top dead center of compression. The ignition starts the spark ignition controlled compression ignition combustion to combust a portion of the mixed gas in the combustion chamber 6 by propagating flame (SI combustion), and then the rest of the mixed gas is combusted by self-ignition (CI combustion).

Figure 6:
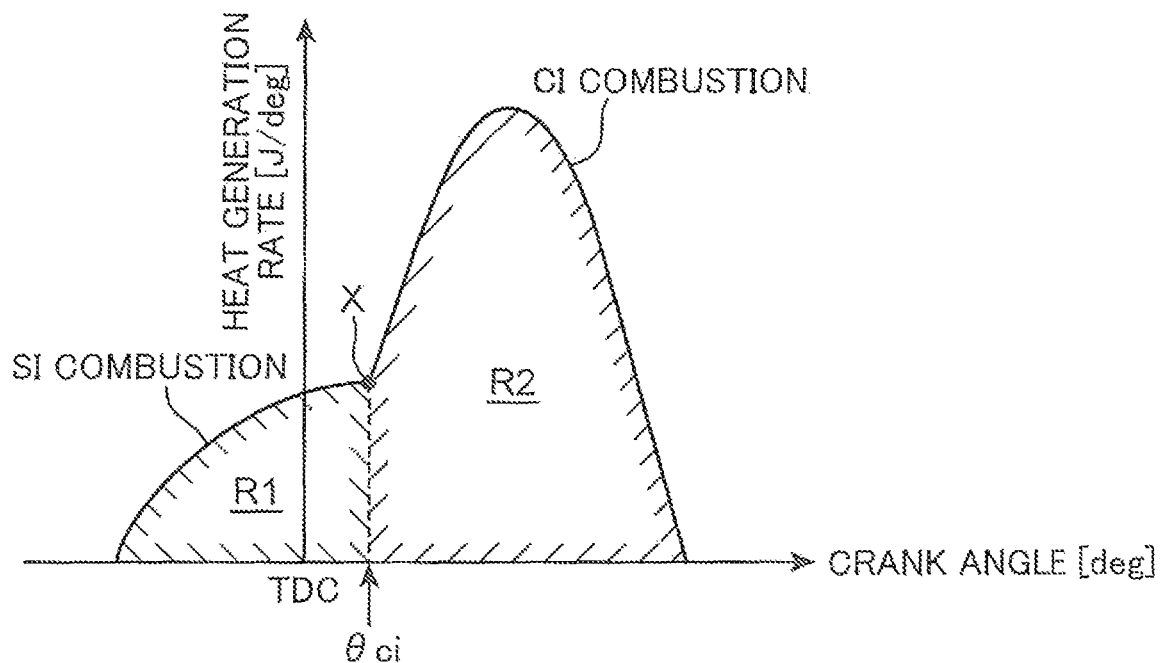
FIG. 6 is a chart illustrating a heat generation rate in spark ignition controlled compression ignition combustion.

An advantage of the spark ignition controlled compression ignition combustion will be described with reference to FIG. 6. FIG. 6 is a chart illustrating a heat generation rate in the spark ignition controlled compression ignition combustion. In the spark ignition controlled compression ignition combustion, heat is generated faster in the CI combustion than in the SI combustion. As illustrated in FIG. 6, the rise in the SI combustion, which is the initial phase of combustion, is less steep than the rise in the CI combustion. As temperature and pressure in the combustion chamber 6 rise by the SI combustion, self-ignition happens in the fresh mixed gas to start the CI combustion. At the timing when the CI combustion starts (inflection point X at crank angle of θci in FIG. 6), the waveform of the heat generation rate changes to a steeper form. In the spark ignition controlled compression ignition combustion, the pressure rising rate (dp/dθ) in the combustion chamber 6 in the SI combustion is smaller than that in CI combustion, corresponding to the trend of the heat generation rate.

After the start of the CI combustion, the SI combustion and the CI combustion are performed in parallel. The heat generation rate is relatively high in the CI combustion, because the combustion speed of the mixed gas is faster in the CI combustion than in the SI combustion. But the waveform of heat generation rate will not be excessively steep, because the CI combustion is created after the piston 5 passing the top dead center of compression. That is, the motoring pressure decreases as the piston 5 descends after passing the top dead center of compression. This suppresses the rise in the heat generation rate, avoiding the dp/dθ becoming excessively large during the CI combustion. Since the CI combustion is performed after the SI combustion in the spark ignition controlled compression ignition combustion as described above, the dp/dθ indicating the level of combustion noise is not likely to become excessively large, so that the combustion noise is further suppressed than a simple CI combustion (combusting the whole fuel by CI combustion).

The spark ignition controlled compression ignition combustion finishes as the CI combustion finishes. Since the combustion speed of the CI combustion is faster than that of the SI combustion, the combustion can be finished earlier than a simple SI combustion (combusting the whole fuel by SI combustion). In other words, the combustion can be finished in an expansion stroke at a timing closer to the top dead center of compression in the spark ignition controlled compression ignition combustion. Thus, the spark ignition controlled compression ignition combustion has an improved fuel consumption than a simple SI combustion.

Referring back to FIG. 5, chart (b) illustrates a form of combustion control performed by the combustion control unit 61 when the engine is operated at an operation point P2 (point in a region with a relatively low load in the third region A3) included in the third region A3 illustrated in FIG. 4. In a low load region in the third region A3, the spark ignition controlled compression ignition combustion is performed in the second air-fuel ratio mode ($\lambda \leq 1$) with the air-fuel ratio of the mixed gas adjusted to $\lambda=1$.

At the operation point P2, the combustion control unit 61 causes the injector 15 to perform the first injection in a suction stroke to jet a relatively large amount of fuel and then the second injection in the compression stroke to jet fuel by a smaller amount than the first injection. The combustion control unit 61 causes the ignition plug 16 to ignite the mixed gas at a timing somewhat in the advanced side from the top dead center of compression. This ignition starts the spark ignition controlled compression ignition combustion, like at the operation point P1 described above.

Chart (c) in FIG. 5 illustrates a form of combustion control performed by the combustion control unit 61 when the engine is operated at an operation point P3 (point in a region with relatively high load in the third region A3) included in the third region A3. In the high load region in the third region A3, a control is performed to combust the mixed gas having the air-fuel ratio somewhat richer than the theoretical air-fuel ratio ($\lambda \leq 1$) in the combustion chamber 6 by spark ignition controlled compression ignition combustion.

At the operation point P3, the combustion control unit 61 causes the injector 15 to jet the whole or most of the fuel to be injected in one cycle during the suction stroke. As illustrated in chart (c), for example, the fuel is injected during a continuous period from the latter phase of the suction stroke to the initial phase of the compression stroke. The combustion control unit 61 causes the ignition plug 16 to ignite the mixed gas at a timing near but in the retarded side from the top dead center of compression. This ignition starts the spark ignition controlled compression ignition combustion, like at the operation points P1 and P2 described above.

Illustrated is an example in the third region A3 of forming the mixed gas having an air-fuel ratio of the theoretical air-fuel ratio of $\lambda=1$ or the mixed gas having an air-fuel ratio of $\lambda \leq 1$ which is somewhat richer than the theoretical air-fuel ratio, depending on the load. Alternatively, the mixed gas may be formed to have the theoretical air-fuel ratio of $\lambda=1$ anywhere in the third region A3. In an embodiment described below, a form of combusting the mixed gas of $\lambda=1$ by the spark ignition controlled compression ignition combustion in the second air-fuel ratio mode in the third region A3 will be described.

Chart (d) in FIG. 5 illustrates a form of combustion control performed by the combustion control unit 61 when the engine is operated at an operation point P4 included in the fourth region A4 where the rotational speed is low and the load is high. In the fourth region A4, SI combustion with a retarded ignition timing (retard SI) is performed instead of the spark ignition controlled compression ignition combustion.

At the operation point P4, the combustion control unit 61 causes the injector 15 to perform the first injection in a suction stroke to jet a relatively large amount of fuel and then the second injection in the later phase of the compression stroke (just before the top dead center of compression) to jet fuel by an amount smaller than the first injection. The combustion control unit 61 causes the ignition plug 16 to perform a retard ignition. The ignition timing for the mixed gas is set, for example, at a relatively retarded timing, that is, a timing retarded from the top dead center of compression by 5 to 20° CA. The ignition starts the SI combustion and the whole mixed gas in the combustion chamber 6 is combusted by propagating flame. The ignition timing is retarded in the fourth region A4 as described above to prevent abnormal combustion such as knocking and preignition.

Chart (e) in FIG. 5 illustrates a form of combustion control performed by the combustion control unit 61 when the engine is operated at an operation point P5 included in a region where both the load and rotational speed are high in the first region A1. In the first region A1, an orthodox SI combustion (intake SI) is performed instead of the spark ignition controlled compression ignition combustion.

At the operation point P5, the combustion control unit 61 causes the injector 15 to jet the fuel in a continuous period from the suction stroke to the compression stroke. At the operation point P5 where the load and the rotational speed are high and therefore the amount of fuel to be injected in one cycle is large, it takes a long crank angle period to inject the necessary amount of fuel. In the middle and low load region in the first region A1, the amount of injected fuel is smaller than that in the chart (e). The combustion control unit 61 causes the ignition plug 16 to ignite the mixed gas at a timing somewhat in the advanced side from the top dead center of compression. The ignition starts the SI combustion and the whole mixed gas in the combustion chamber 6 is combusted by propagating flame.

[Vehicle Attitude Control]

Figure 7:
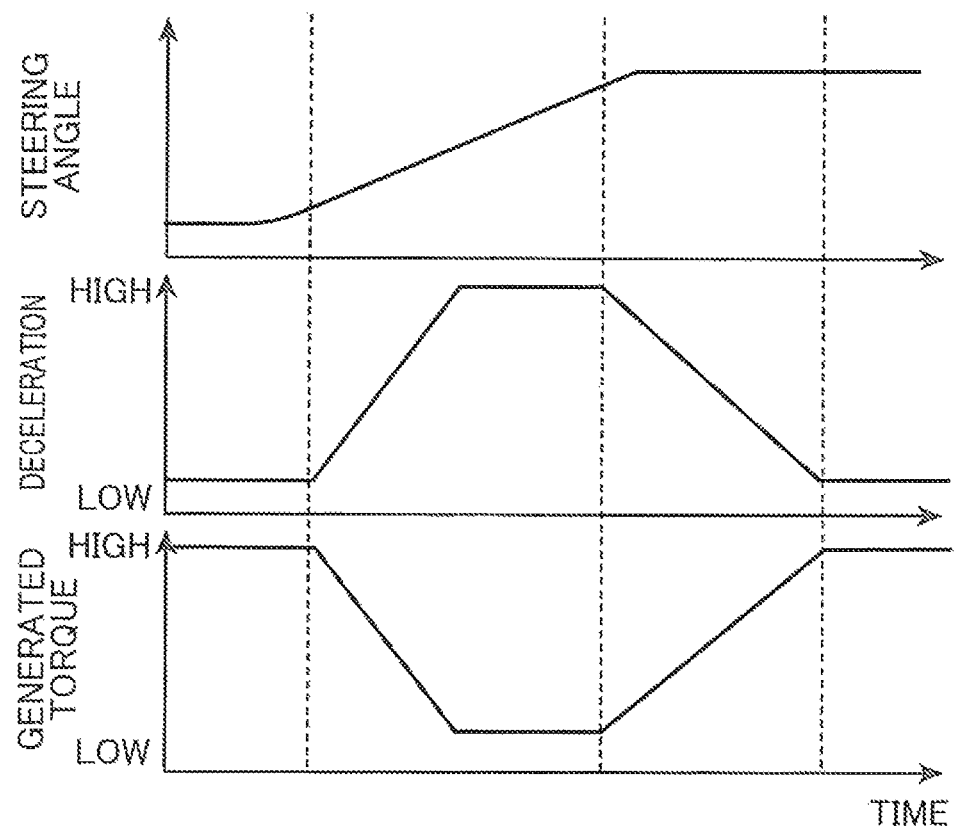
FIG. 7 is a timing chart schematically illustrating a control mode of vehicle attitude control.

Vehicle attitude control performed by the vehicle attitude control unit 62 will now be described. FIG. 7 is a timing chart schematically illustrating a form of vehicle attitude control according to the embodiment. In FIG. 7, relationship among the steering angle of the front wheels 102 given by the steering 105, deceleration of the vehicle 100 caused by the vehicle attitude control, and a torque generated to create the deceleration is illustrated.

When a change in the steering angle of the steering 105 detected by the steering angle sensor SN11 reaches or exceeds a predetermined standard change (when the steering speed reaches or exceeds a predetermined value), the vehicle attitude control unit 62 determines that the vehicle 100 is in a cornering state and gradually increases deceleration. In the embodiment as described above, the torque generated by the engine body 1 is reduced by the retard control performed on the ignition timing of the ignition plug 16 or the amount decreasing control performed on the fuel supplied into the cylinder 2 to reduce the driving power of the vehicle 100, thereby increasing deceleration.

Specifically, the vehicle attitude control unit 62 reduces the engine torque to be smaller than a requested engine torque for normal driving, that is, a target basic engine torque determined based on the vehicle speed detected by the crank angle sensor SN1 and the open percent of the accelerator 107 detected by the accelerator open percent sensor SN10. When the steering speed decreases to be smaller than a predetermined value, the vehicle attitude control unit 62 gradually decreases deceleration. In this manner, the cornering force of the front wheels 102 can be increased during cornering to smoothly turn the vehicle 100.

Figure 8:
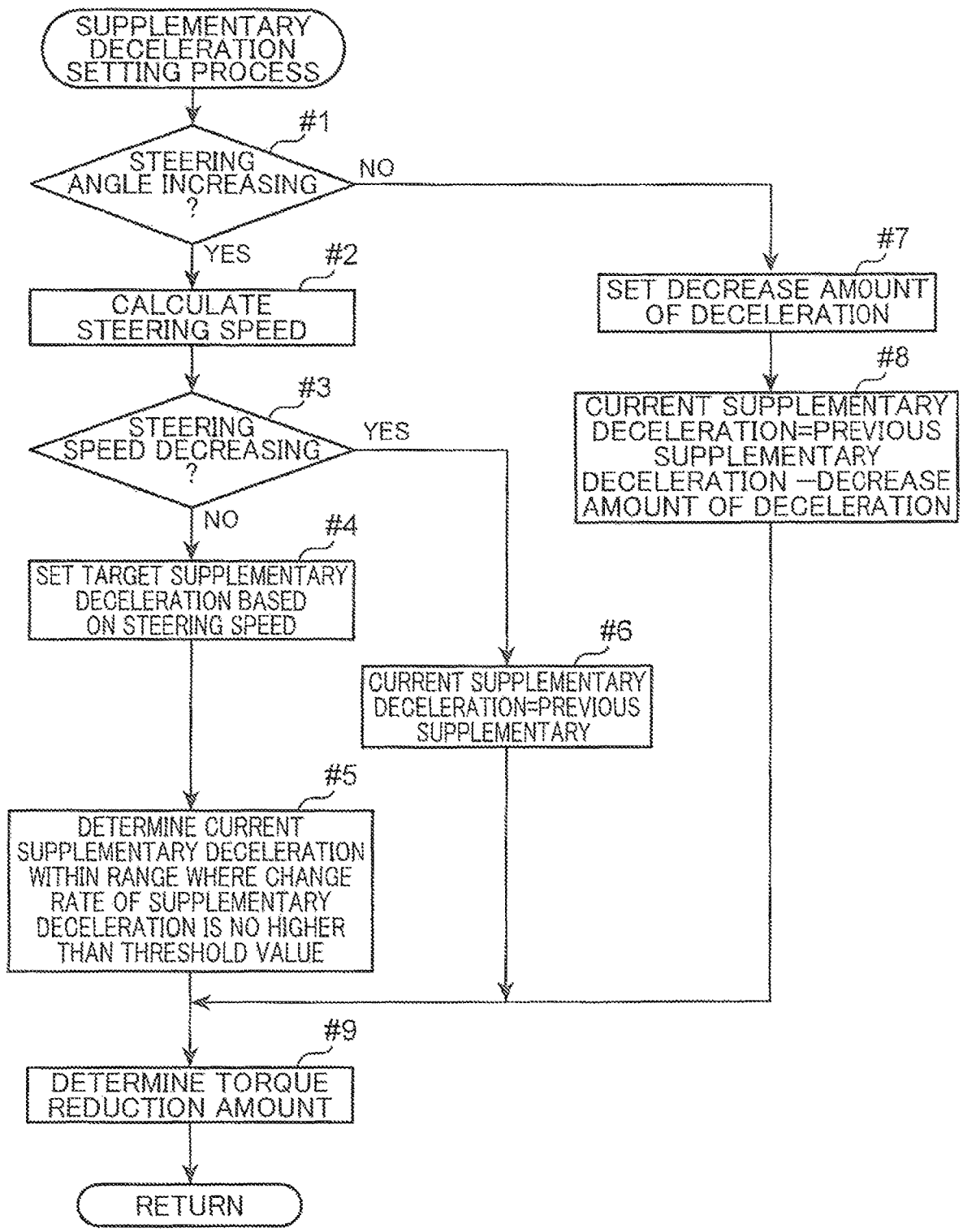
FIG. 8 is a flowchart illustrating a specific exemplary control of the vehicle attitude control.

A specific example of the vehicle attitude control will be described with reference to a flowchart in FIG. 8. In FIG. 8, the vehicle attitude control is referred to as "supplementary deceleration setting process" to indicate that deceleration is applied by torque reduction of the target basic engine torque. When the supplementary deceleration setting process starts, the vehicle attitude control unit 62 determines whether an absolute value of the steering angle obtained from detection by the steering angle sensor SN11 is increasing (step #1). If the absolute value of the steering angle is increasing (YES in step #1), the vehicle attitude control unit 62 calculates the steering speed from the obtained steering angle (step #2).

Then, the vehicle attitude control unit 62 determines whether the absolute value of the steering speed obtained in step #2 is decreasing (step #3). If the absolute value of the steering speed is not decreasing (YES in step #3), that is, if the absolute value of the steering speed is increasing or unchanged, the vehicle attitude control unit 62 sets a target supplementary deceleration based on the steering speed (step #4). The target supplementary deceleration is a deceleration to be applied to the vehicle 100 according to a manipulation intentionally given to the steering 105 by the driver.

Figure 9:
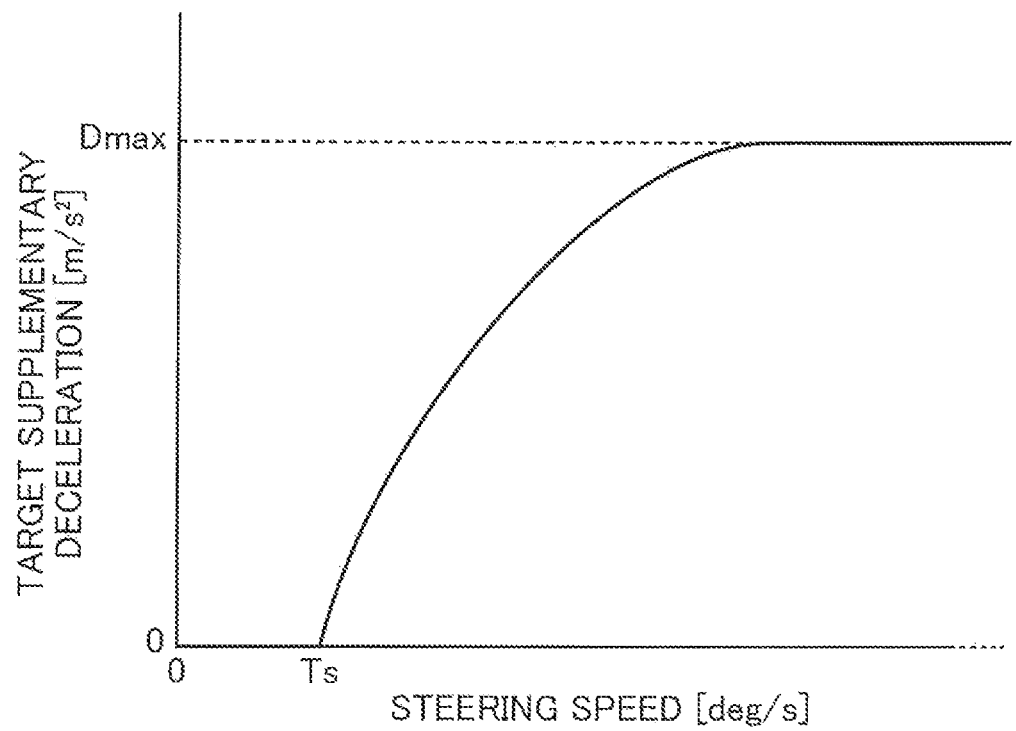
FIG. 9 is a chart illustrating a relationship between a steering speed and a target supplementary deceleration.

Specifically, the vehicle attitude control unit 62 obtains the target supplementary deceleration corresponding to the steering speed calculated in step #2 based on the relationship between the target supplementary deceleration and the steering speed illustrated in a map in FIG. 9. As shown in FIG. 9, the target supplementary deceleration is zero when the steering speed is no larger than a predetermined threshold Ts. When the steering speed is no larger than the threshold Ts, the vehicle attitude control unit 62 does not perform a control of reducing the engine torque to apply deceleration to the vehicle 100 (vehicle attitude control) even if the steering 105 is turned. Meanwhile, when the steering speed exceeds the threshold Ts, the target supplementary deceleration corresponding to the steering speed gradually approaches a predetermined upper limit value Dmax (for example, 1 m/s$^2$) along with the increase in the steering speed. That is, the target supplementary deceleration is larger for the larger steering speed and the increase rate of the target supplementary deceleration is smaller.

Then, the vehicle attitude control unit 62 determines the maximum increase rate Rmax, which is a threshold of the supplementary deceleration applied to the vehicle 100 in the current process. The vehicle attitude control unit 62 determines the supplementary deceleration for the current process to take a value in such a range that the increase rate of the supplementary deceleration is no larger than the maximum increase rate Rmax (step #5).

Specifically, if the increase rate from the supplementary deceleration set in the previous process to the target supplementary deceleration set in step #4 of the current process is no larger than the maximum increase rate Rmax, the vehicle attitude control unit 62 determines that the target supplementary deceleration determined in step #4 is the supplementary deceleration for the current process. Meanwhile, if the increase rate from the previous supplementary deceleration in the previous process to the target supplementary deceleration determined in step #4 of the current process is larger than Rmax, the vehicle attitude control unit 62 determines that a value obtained by increasing the supplementary deceleration of the previous step by the increase rate of Rmax as the supplementary deceleration for the current process.

If the absolute value of the steering speed is decreasing in step #3 (YES in step #3), the vehicle attitude control unit 62 determines that the supplementary deceleration determined in the previous process is the supplementary deceleration for the current process (step #6). That is, if the absolute value of the steering speed is decreasing, the supplementary deceleration at the maximum steering speed (maximum value of the supplementary deceleration) is maintained.

If the absolute value of the steering angle is not increasing in step #1 (NO in step #1), the vehicle attitude control unit 62 sets an amount by which the supplementary deceleration determined in the previous process is decreased in the current process (decrease amount of deceleration) (step #7). The decrease amount of deceleration is calculated based on a constant decrease rate (for example, 0.3 m/s$^3$) stored in a memory, for example, previously included in the ECU 60. Alternatively, the decrease amount of deceleration is calculated based on, for example, the operating condition of the vehicle 100 obtained by the sensors, and the decrease rate determined from the steering speed calculated in step #2. The vehicle attitude control unit 62 subtracts the decrease amount of deceleration set in step #7 from the supplementary deceleration determined in the previous process and determines the supplementary deceleration for the current process (step #8).

Then after, the vehicle attitude control unit 62 determines the torque reduction amount based on the current supplementary deceleration determined in step #5, step #6, or step #8 (step #9; step of setting torque reduction). Specifically, the vehicle attitude control unit 62 determines the torque reduction amount necessary to create the current supplementary deceleration based on, for example, a current vehicle speed, a selected gear, or an inclination of road. The vehicle attitude control unit 62 controls the combustion control unit 61 to perform the retard control on the ignition timing of the ignition plug 16 or the amount decreasing control on the fuel supplied into the cylinder 2 to reduce the engine torque by the determined torque reduction amount.

[Switching Control on Torque Reduction Method]

In the engine body 1 according to the embodiment as described above, the vehicle attitude control is performed to reduce the torque generated by the engine body 1 when the change in the steering angle per a unit time reaches or exceeds the predetermined standard change (this is referred to as "when a first condition is satisfied"). Meanwhile, not only the SI combustion (first combustion mode) but also the spark ignition controlled compression ignition combustion (second combustion mode) is performed as a form of combustion of the mixed gas in the combustion chamber 6 of the engine body 1. That is, when the requested torque determined by the accelerator open percent and the vehicle speed is in the second region A2 and the third region A3 illustrated in FIG. 4 (this is referred to as "when a second condition is satisfied"), the spark ignition controlled compression ignition combustion in which the self-ignition happens in the mixed gas at a predetermined timing is performed. Either the SI combustion or the spark ignition controlled compression ignition combustion is selected according to the operating condition of the engine (step of setting combustion mode).

When the vehicle attitude control unit 62 determines that the first condition is satisfied, the vehicle attitude control unit 62 performs the vehicle attitude control (see FIG. 8). When the combustion control unit 61 determines that the second condition is satisfied, the combustion control unit 61 controls the timing of the injector 15 jetting the fuel and the timing of operating (igniting) the ignition plug 16 to create the spark ignition controlled compression ignition combustion (see FIG. 5). Furthermore, during the spark ignition controlled compression ignition combustion, mode switching is performed between the first air-fuel ratio mode ($\lambda$>1) in which the mixed gas is formed to be leaner than the theoretical air-fuel ratio and the second air-fuel ratio mode ($\lambda \leq 1$) in which the mixed gas is formed to have the theoretical air-fuel ratio or richer (switching step; see the charts (b) and (c) in FIG. 5).

When both the first condition and second condition are satisfied at the same time, the vehicle attitude control and the spark ignition controlled compression ignition combustion are performed, overlapping each other. This means that the engine torque may be reduced to perform the vehicle attitude control when the spark ignition controlled compression ignition combustion is being performed. The easiest method of torque reduction is retarding the ignition timing of the ignition plug 16 (ignition retard). However, performing the ignition retard for vehicle attitude control when the spark ignition controlled compression ignition combustion is being performed might cause instable combustion. That is, retarding the timing of starting the SI combustion in the spark ignition controlled compression ignition combustion by the ignition retard might hinder the cylinder internal pressure in the combustion chamber 6 from reaching a cylinder internal pressure necessary for the CI combustion which is performed in the latter phase of combustion. In such a case, the combustion in the combustion chamber 6 might become instable or misfire might happen (instable combustion).

In view of such a problem, the determining unit 63 of the embodiment determines whether the instable combustion might occur in the operating condition. Specifically, whether the first condition and the second condition are satisfied at the same time is determined. If the determining unit 63 determines that the instable combustion may occur, the determining unit 63 switches the method of engine torque reduction for the vehicle attitude control from the ignition retard to the amount decreasing control to decrease the amount of fuel supplied into the cylinder 2. By decreasing the fuel amount to be smaller than the amount set for the requested torque, the engine torque will decrease by itself without the ignition retard being performed. Meanwhile, since the timing of forced ignition of the mixed gas by the ignition plug 16 is kept at the timing set for the spark ignition controlled compression ignition combustion, the SI combustion starts at a regular timing. Thus, the predetermined spark ignition controlled compression ignition combustion is created.

Figure 10A:
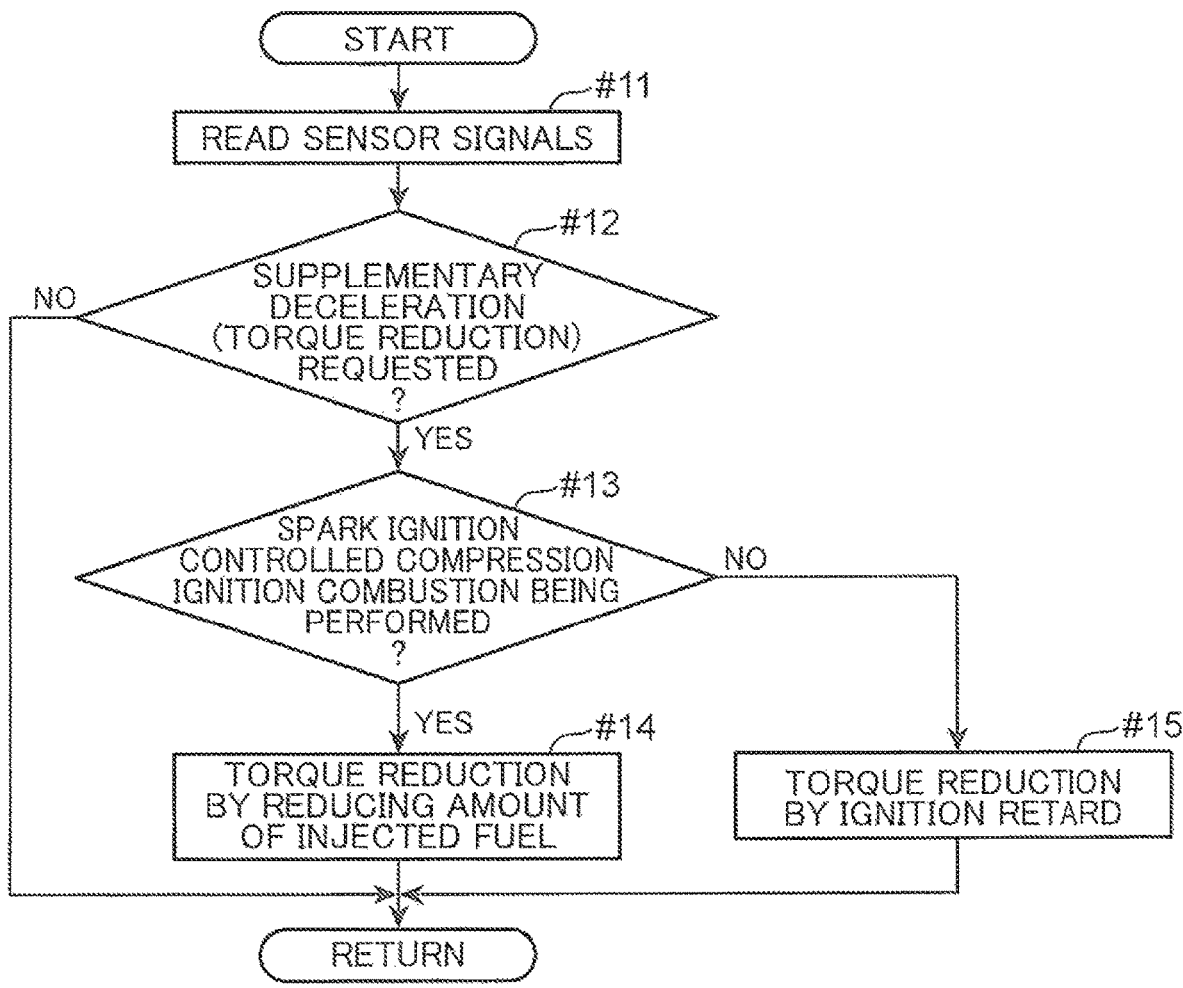
FIG. 10A is a flowchart illustrating an exemplary process of setting a method of torque reduction.

The switching control on the method of torque reduction by the determining unit 63 will be described with reference to the flowcharts illustrated in FIGS. 10A and 10B. FIG. 10A illustrates an exemplary control of switching the method of engine torque reduction for the vehicle attitude control according to whether the spark ignition controlled compression ignition combustion is being performed, namely, whether the engine is operated in the second region A2 or the third region A3 in the operation map in FIG. 4.

When the engine controlling process starts, the ECU 60 (FIG. 3) reads sensor signals related to the operating condition of the vehicle 100 (step#11). Specifically, the ECU 60 obtains pieces of information including the vehicle speed obtained from a value detected by the crank angle sensor SN1, the open percent of the accelerator 107 detected by the accelerator open percent sensor SN10, the steering angle of the steering 105 detected by the steering angle sensor SN11, and the current gear selected in a transmission of the vehicle 100.

Then, the determining unit 63 determines whether the supplementary deceleration is requested, namely, whether there exists a request for torque reduction for the vehicle attitude control (whether the first condition is satisfied) (step #12). If the increase in the steering angle exceeds a standard increase, the vehicle attitude control unit 62 requests the supplementary deceleration (YES in step #12). In this case, the determining unit 63 determines whether the combustion control unit 61 is performing the spark ignition controlled compression ignition combustion (whether the second condition is satisfied) (step #13). If there is no request for the supplementary deceleration (NO in step #12), the determining unit 63 finishes the process (return to step #11).

When the spark ignition controlled compression ignition combustion is being performed (YES in step #13), the determining unit 63 sets that the vehicle attitude control unit 62 performs torque reduction for the vehicle attitude control by the amount decreasing control in which the amount of fuel jetted by the injector 15 is decreased (step of setting torque reduction; step #14). That is, when the first condition and the second condition are satisfied, the determining unit 63 performs the amount decreasing control in which the amount of fuel supplied into the cylinder 2 is decreased to reduce the torque generated by the engine body 1. The decreased amount of the jetted fuel is set larger for a larger torque reduction amount.

In contrast, when the spark ignition controlled compression ignition combustion is not performed (NO in step #13), that is, when the engine is operated in the first region A1 or the fourth region A4 in the operation map in FIG. 4, the determining unit 63 sets that the vehicle attitude control unit 62 performs the torque reduction for the vehicle attitude control by the ignition retard control in which the ignition timing of igniting the mixed gas by the ignition plug 16 is retarded (step #15). That is, when the first condition is satisfied but the second condition is not satisfied, the determining unit 63 retards the timing of operating the ignition plug 16 to reduce the torque generated by the engine body 1. The degree of retarding the ignition timing is set larger for a larger torque reduction amount. After performing step #14 and step #15, the determining unit 63 finishes the process (return to step #11).

In the exemplary control in FIG. 10A as described above, the torque generated by the engine is reduced not by the ignition retard but by the amount decreasing control in which the fuel amount is decreased if the determining unit 63 determines that the first condition and the second condition are satisfied. That is, the vehicle attitude control is performed not by the ignition retard but by the amount decreasing control on the fuel when the spark ignition controlled compression ignition combustion is being performed. Since the timing of starting the SI combustion in the spark ignition controlled compression ignition combustion is not retarded, the temperature and pressure in the cylinder are sufficiently raised by the heat produced by the SI combustion, and thereby the CI combustion is suitably performed without misfire in the latter phase of combustion. Meanwhile, when the SI combustion is being performed instead of the spark ignition controlled compression ignition combustion, the problem of misfire substantially does not occur. In such a case, the control can be simplified since the vehicle attitude control is performed by the ignition retard.

FIG. 10B illustrates an exemplary control of switching the method of engine torque reduction for the vehicle attitude control according to whether the spark ignition controlled compression ignition combustion is being performed in the first air-fuel ratio mode ($\lambda>1$) in which the mixed gas having a lean air-fuel ratio is combusted, namely, whether the engine is operated in the second region A2 in the operation map in FIG. 4.

Description on processes of step #21 and step #22 is omitted, because the processes are similar to that of step #11 and step #12. When the vehicle attitude control unit 62 is requesting the supplementary deceleration (YES in step #22), the determining unit 63 determines whether the combustion control unit 61 is performing the spark ignition controlled compression ignition combustion in the first air-fuel ratio mode ($\lambda>1$) (whether the second condition is satisfied and the first mode is being performed) (step #23).

When the spark ignition controlled compression ignition combustion is performed in the first air-fuel ratio mode (YES in step #23), the determining unit 63 sets that the vehicle attitude control unit 62 performs torque reduction for the vehicle attitude control by the amount decreasing control in which the amount of fuel jetted by the injector 15 is decreased (step #24). That is, when the first condition and the second condition are satisfied and the first air-fuel ratio mode ($\lambda>1$) is being performed, the determining unit 63 performs the amount decreasing control in which the amount of fuel supplied into the cylinder 2 is decreased to reduce the torque generated by the engine body 1.

In contrast, when the spark ignition controlled compression ignition combustion is not performed in the first air-fuel ratio mode (NO in step #23), that is, when the engine is operated with the SI combustion in the first region A1 or the fourth region A4 or with the spark ignition controlled compression ignition combustion in the second air-fuel ratio mode ($\lambda\leq1$) in the third region A3 in the operation map in FIG. 4, the determining unit 63 sets that the vehicle attitude control unit 62 performs the torque reduction for the vehicle attitude control by the ignition retard control in which the ignition timing of igniting the mixed gas by the ignition plug 16 is retarded (step #25). That is, when the first condition is satisfied but the second condition is not satisfied and when the first condition and the second condition are satisfied and the second air-fuel ratio mode is being performed, the determining unit 63 retards the timing of operating the ignition plug 16 to reduce the torque generated by the engine body 1.

In the exemplary control in FIG. 10B as described above, the torque generated by the engine is reduced not by the ignition retard but by the amount decreasing control in which the fuel amount is decreased if the determining unit 63 determines that the first condition and the second condition are satisfied and the first air-fuel ratio mode ($\lambda>1$) is being performed. That is, the vehicle attitude control is performed not by the ignition retard but by the amount decreasing control on the fuel when the spark ignition controlled compression ignition combustion is being performed with the mixed gas having a lean air-fuel ratio. When the ignition retard is performed when combustion is performed in the first air-fuel ratio mode ($\lambda>1$) where the mixed gas is lean, self-ignition is not likely to happen, so misfire is more likely to occur. However, in the exemplary control described above, the amount decreasing control on the fuel is performed for the vehicle attitude control when the spark ignition controlled compression ignition combustion is being performed in the first air-fuel ratio mode ($\lambda>1$), so that chances of misfire is effectively suppressed.

While the ignition retard increases the chances of misfire when the mixed gas has a lean air-fuel ratio, the ignition retard relatively lowers the chances of misfire in the second air-fuel ratio mode in which the mixed gas is formed to have an air-fuel ratio equal to or richer than the theoretical air-fuel ratio. According to the exemplary control, the ignition retard is selected for the torque reduction when the vehicle attitude control is performed when the spark ignition controlled compression ignition combustion is being performed in the second air-fuel ratio mode. Thus, the vehicle attitude control can be performed by controlling the operating timing (ignition timing) of the ignition plug 16, which is a relatively easy control.

[Control of Suppressing Hunting]

A process where the vehicle attitude control and a mode-change of the spark ignition controlled compression ignition combustion overlap each other will now be described. In the embodiment, the spark ignition controlled compression ignition combustion is performed in the first air-fuel ratio mode ($\lambda>1$) or the second air-fuel ratio mode ($\lambda\leq1$). For example, the first air-fuel ratio mode is used in order to increase thermal efficiency of the engine by using a lean air-fuel ratio, and the second air-fuel ratio mode is used in a state where combustion stability is prioritized. When the vehicle attitude control is performed, a cycle of temporarily reducing the torque generated by the engine to increase the grip of the tire of the front wheel 102 and then returning the torque to the requested torque is repeated as illustrated in FIG. 7. Meanwhile, the switching of the air-fuel ratio mode of the spark ignition controlled compression ignition combustion is performed depending mainly on the engine load and the rotational speed as illustrated in the operation map in FIG. 4. Thus, performing the vehicle attitude control fluctuates the engine torque (load) and might cause hunting in which the mode switching of the spark ignition controlled compression ignition combustion frequently occurs. That is, such a case may happen that the load fluctuates and crosses the boundary between the second region A2 and the third region A3 illustrated in FIG. 4 many times in a short period of time, and in response to this, switching of the air-fuel ratio mode is requested many times.

It should be noted that the mode-change hardly can be made in an instant. As described above, when the spark ignition controlled compression ignition combustion is performed in the first air-fuel ratio mode, the air-fuel ratio A/F is set to a lean value which is about 25/1 to 30/1 (first air-fuel ratio range), and when performed in the second air-fuel ratio mode, the air-fuel ratio A/F is set to 14.7/1 (second air-fuel ratio range). There exists a third air-fuel ratio range between the air-fuel ratio modes. The third air-fuel ratio range is neither included in the first air-fuel ratio range nor the second air-fuel ratio range. Operating in the third air-fuel ratio range creates lean combustion producing NOx and thus should be avoided. However, with existence of the third air-fuel ratio range, mode switching between the first and second air-fuel ratio modes in which the amount of intake air and the amount of injected fuel are changed to adjust the air-fuel ratio cannot be made in an instance but needs a certain period of time. Furthermore, the state is instable during the switching of the air-fuel ratio mode where a condition, such as the amount of intake air or the amount of injected fuel into the cylinder, changes to create an air-fuel ratio of the air-fuel ratio mode, respectively. When the torque reduction control for the vehicle attitude control overlaps in such a state, troubles such as instable combustion or misfire may occur. This is more likely to happen under the hunting.

In this point of view, the embodiment performs such a control that can avoid the vehicle attitude control and the switching of the air-fuel ratio mode of the spark ignition controlled compression ignition combustion overlapping each other in such a case that the overlapping may happen. Specifically, if it is determined that the vehicle attitude control is necessary, the determining unit 63 performs a control of suppressing (disallowing) the mode-change even if the switching of the air-fuel ratio mode is requested (suppressing control).

FIG. 10C is a simplified flowchart illustrating an operation that can substantially perform the suppressing control. The ECU 60 reads signals from the sensors provided in the vehicle 100 (step #31). The determining unit 63 then determines whether switching of the air-fuel ratio mode between the first air-fuel ratio mode ($\lambda>1$) and the second air-fuel ratio mode ($\lambda\leq1$) is requested under the original requested torque to which the torque reduction for the vehicle attitude control is not yet applied (step #32). That is, determination on the switching of the air-fuel ratio mode is made with reference to the target torque to which the torque reduction for the vehicle attitude control is not yet applied.

If the switching of the air-fuel ratio mode with reference to the target torque is requested (YES in step #32), the determining unit 63 allows performing the mode switching. In this case, the combustion control unit 61 performs the necessary mode switching (step #33). In contrast, if the switching of the air-fuel ratio mode is not requested, (NO in step #32), the determining unit 63 skips the step #33. That is, the determination is made on whether the mode switching is needed under the requested torque without taking the torque reduction for the vehicle attitude control into consideration, so that even in a case where hunting of the mode switching may happen by taking the torque reduction into consideration, such hunting can be prevented.

In the exemplary control in FIG. 10C as described above, when the torque reduction for the vehicle attitude control is taken into consideration, the mode switching can be suppressed (disallowed) even when the condition for performing the mode switching between the first mode and the second mode is satisfied. When the vehicle attitude control is performed, a cycle of reducing the engine torque and returning the engine torque to the requested torque is repeated (see FIG. 7). Meanwhile, the mode switching of the spark ignition controlled compression ignition combustion is performed depending mainly on the engine load (torque) and the rotational speed (see FIG. 4). Thus, performing the vehicle attitude control fluctuates the engine torque and might cause hunting in which the mode switching of the spark ignition controlled compression ignition combustion frequently occurs with the fluctuation. By using the exemplary control in FIG. 10C in which the mode switching is substantially suppressed when the vehicle attitude control is being performed, the hunting is suppressed and instable combustion can be prevented.

Specific Example of Engine Control Method

A specific embodiment of an operational control to which the engine control method according to the present invention is applied will now be described. FIG. 11 is a flowchart illustrating a basic operation of the engine control method according to the embodiment. When a process starts, the ECU 60 (FIG. 3) reads sensor signals that are output by the sensors SN1 to SN13 and related to the operating condition of the vehicle 100 (step S1). The ECU 60 (vehicle attitude control unit 62) then refers to information including the vehicle speed (crank angle sensor SN1), the accelerator open percent (accelerator open percent sensor SN10), the steering angle (steering angle sensor SN11), and the current gear selected in the transmission of the vehicle 100 obtained by the sensor signals read in step S1 and performs a processing of setting a supplementary deceleration (torque reduction amount) for the vehicle attitude control (step S2; step of setting torque reduction). A specific example of the supplementary deceleration setting process is as described above based on the flowchart in FIG. 8. The ECU 60 then applies the supplementary deceleration set in step S2 to perform the engine controlling process (step S3). The engine controlling process in step S3 will be described in detail with reference to the flowcharts illustrated in FIGS. 12 to 15.

<Setting Control Target Value for Combustion Condition>

FIG. 12 is a flowchart illustrating the engine controlling process in detail, mainly on a step of setting a control target value of a combustion condition. When the control process starts, the ECU 60 (combustion control unit 61) refers to information including the vehicle speed, the accelerator open percent, and the current gear in the transmission obtained in step S1 in FIG. 11 and sets a target acceleration (target G) for the vehicle 100 (step S11). The ECU 60 then sets the target basic engine torque for realizing the target acceleration which has been set (step S12). The target basic engine torque is a requested torque calculated based on an amount by which the driver pushes in the accelerator 107 with the torque reduction by the vehicle attitude control not yet taken into consideration.

The ECU 60 then sets a target combustion mode from the target basic engine torque and the engine rotational speed detected by the crank angle sensor SN1 (step S13; step of setting combustion mode). To set the target combustion mode, for example, the operation map, illustrated in FIG. 4, predetermined from the relationship between the engine rotational speed and the load is referred. That is, the ECU 60 determines to which one of the first region A1 to the fourth region A4 in the operation map the operating condition with the current engine rotational speed and the target basic engine torque (load) set in step S12 belongs, and sets one of the combustion modes illustrated in the charts (a) to (e) in FIG. 5 as the target combustion mode.

The ECU 60 (determining unit 63) sets the method of torque reduction for the vehicle attitude control according to the target combustion mode set in step S13 (step S14). In the embodiment described above, either decreasing the amount of fuel jetted by the injector 15 or the ignition retard to retard the timing of operating the ignition plug 16 is selected as the method of torque reduction. An exemplary control of selecting either of the methods is illustrated in the flowcharts in FIGS. 10A and 10B. For example, when the exemplary control illustrated in FIG. 10B is employed, the relationship between the target combustion mode and the method of torque reduction is as shown in Table 1.

TABLE 1

| TARGET COMBUSTION MODE | METHOD OF TORQUE REDUCTION |
| --- | --- |
| SPARK IGNITION CONTROLLED COMPRESSION IGNITION_$\lambda$ > 1 (FIRST AIR-FUEL RATIO MODE) | REDUCE AMOUNT OF INJECTED FUEL |
| SPARK IGNITION CONTROLLED COMPRESSION IGNITION_$\lambda$ = 1 (SECOND AIR-FUEL RATIO MODE) | IGNITION RETARD |
| SI_$\lambda$ = 1 | IGNITION RETARD |

The ECU 60 (determining unit 63) determines whether switching between the first air-fuel ratio mode ($\lambda$>1) and the second air-fuel ratio mode ($\lambda$=1) is requested for the spark ignition controlled compression ignition combustion (step S15). The determination for the switching between the first air-fuel ratio mode ($\lambda$>1) and the second air-fuel ratio mode ($\lambda$=1) is performed based on the target basic engine torque set in step S12, where the torque reduction amount for the vehicle attitude control is not yet subtracted from the target basic engine torque. By determining the switching based on the target basic engine torque, hunting of the switching of the air-fuel ratio mode can be prevented even in a case where such hunting may occur by taking the torque reduction amount into consideration.

The determination step S15 is interposed for the following reason. When the spark ignition controlled compression ignition combustion is performed in the first air-fuel ratio mode, the air-fuel ratio A/F is set to a lean value which is about 25/1 to 30/1, and when performed in the second air-fuel ratio mode, the air-fuel ratio A/F is set to 14.7/1 ($\lambda$=1). When mode switching is performed between the first air-fuel ratio mode and the second air-fuel ratio mode, the state becomes instable where a condition, such as the amount of intake air or the amount of injected fuel into the cylinder, changes to create an air-fuel ratio of the mode. When the torque reduction control for the vehicle attitude control overlaps in such a state, troubles such as instable combustion or misfire may occur. In this point of view, if the mode switching is not requested (YES in step S15), the determining unit 63 performs the torque reduction control for the vehicle attitude control (steps S16 to S18 described below), whereas if the mode switching is requested (NO in step S15), the determining unit 63 disallows the torque reduction control for the vehicle attitude control. In the latter case, a constant torque mode switching control is performed to switch the mode without changing the torque (a control in FIG. 14 or a control in FIG. 15 described below).

If the mode switching is not requested, the ECU 60 (combustion control unit 61) sets a target final engine torque from the target basic engine torque set in step S12 and the torque reduction amount set in step S2 in FIG. 11 (step #9 in FIG. 8) (step S16). The target final engine torque is calculated by subtracting the amount of torque reduction for the vehicle attitude control from the requested torque. If the vehicle attitude control is not requested, the amount of torque reduction to be subtracted is unquestionably zero. Based on the target final engine torque, the ECU 60 sets a target combustion pressure in the combustion chamber 6 (step S17).

The ECU 60 then sets a control target value for the combustion condition from the target combustion pressure set in step S17 and the target combustion mode set in step S13 (step S18). Specifically, values such as a target amount of air to be supplied into the combustion chamber 6, a target self-ignition timing to create the CI combustion, a target SI ratio, a target air-fuel ratio, and a target ignition timing to ignite the mixed gas by the ignition plug 16 are set.

The SI ratio is the ratio of the heat generated by the SI combustion to the entire heat generated by the spark ignition controlled compression ignition combustion. An inflection point X in FIG. 6 is when the combustion switches from the SI combustion to the CI combustion. An area R1 of a waveform showing the heat generation rate in a region advanced from the crank angle θci corresponding to the inflection point X is the heat generation rate of the SI combustion, and an area R2 of a waveform showing the heat generation rate in a region retarded from the crank angle θci is the heat generation rate of the CI combustion. The SI ratio is expressed by the areas R1 and R2: SI ratio=R1/(R1+R2).

Figure 16:
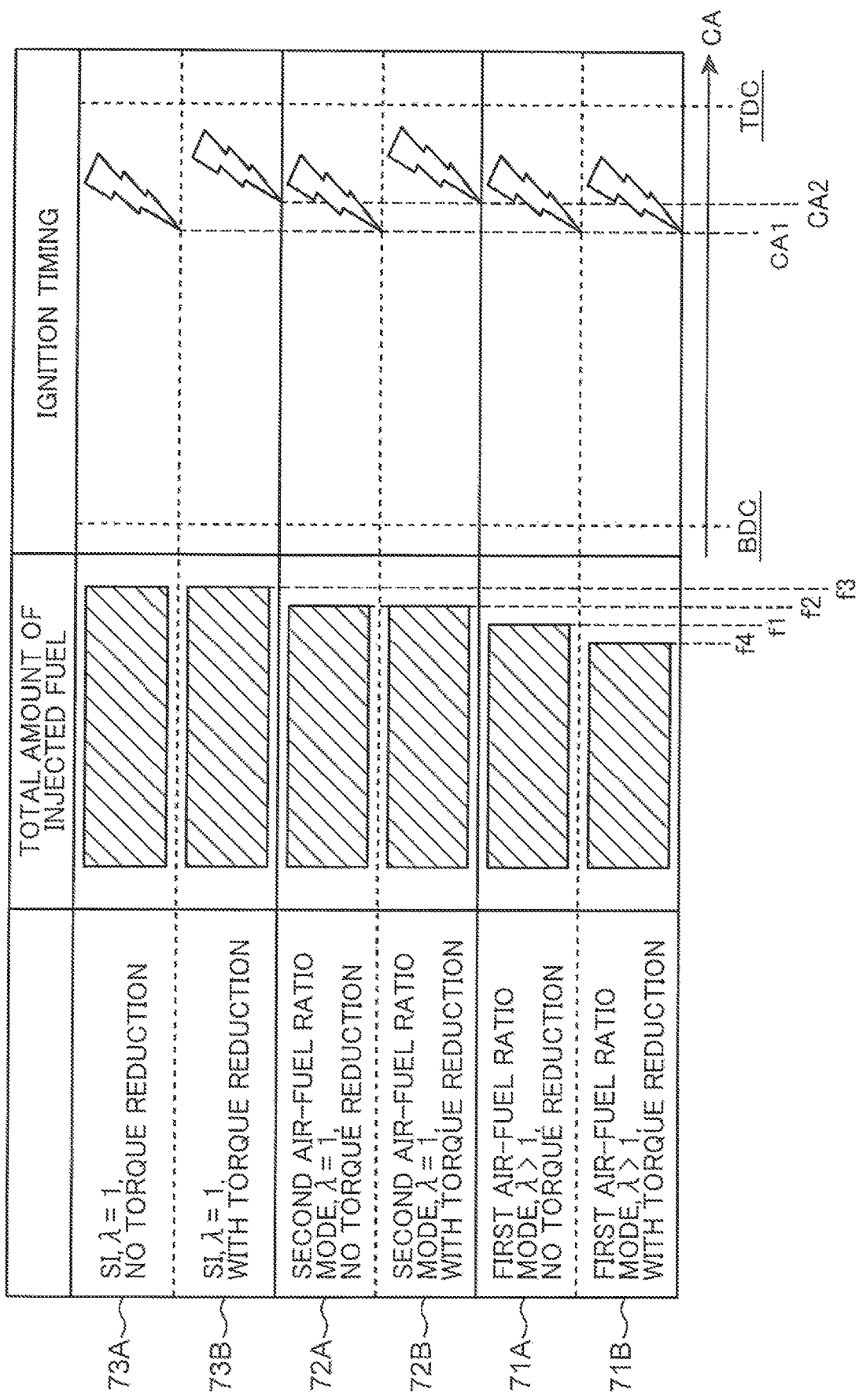
FIG. 16 is a tabular chart illustrating a relationship among an operating mode, a total amount of injected fuel, and an ignition timing.

FIG. 16 is a tabular figure illustrating the relationship among the target combustion mode, the total amount of injected fuel, and the ignition timing for cases where the exemplary control illustrated in FIG. 10B is used for setting the method of torque reduction in step S14. With "no torque reduction" for the vehicle attitude control, the total amount of injected fuel is set to a predetermined f1 for the first air-fuel ratio mode 71A ($\lambda$>1) of the spark ignition controlled compression ignition combustion, a predetermined f2 for the second air-fuel ratio mode 72A ($\lambda$=1) of the SPCCI combustion, and a predetermined f3 for the SI combustion mode 73A, and the ignition timing is set to a predetermined crank angle CA1.

In contrast, "with torque reduction" for the vehicle attitude control, the total amount of injected fuel for the first air-fuel ratio mode 71B ($\lambda$>1) of the spark ignition controlled compression ignition combustion is changed to f4 which is smaller than the f1 for the "no torque reduction" by a predetermined amount. Meanwhile, the target ignition timing is kept at the timing of the crank angle CA1 and the ignition retard is not performed. In the second air-fuel ratio mode 72B ($\lambda$=1) of the spark ignition controlled compression ignition combustion "with torque reduction", the total amount of injected fuel is kept at f2 but the ignition retard is performed to retard the target ignition timing from the crank angle CA1 to CA2. Similarly, in the SI combustion mode 73B "with torque reduction", the total amount of injected fuel is kept at f3 but the ignition retard is performed to retard the target ignition timing from the crank angle CA1 to CA2.

<Detail on Controlling Spark Ignition Controlled Compression Ignition Combustion>

FIG. 13 is a flowchart illustrating an engine controlling process in detail, mainly on controlling the spark ignition controlled compression ignition combustion. Subsequent to step S18 in FIG. 12, the ECU 60 determines whether the SI ratio is below 100%, that is, whether the target combustion mode is the spark ignition controlled compression ignition combustion (SI ratio=100% means SI combustion) (step S20).

If the target combustion mode is the spark ignition controlled compression ignition combustion (second combustion mode) (YES in step S20), a process of setting control values for actuators other than the injector 15 and the ignition plug 16 is first performed (steps S21 to S24). Specifically, the ECU 60 (combustion control unit 61) sets a target EGR ratio from the target amount of air set in step S18 and a cylinder internal temperature estimated at the target self-ignition timing (step S21). The EGRs performed in the embodiment are an internal EGR performed by controlling the open/close timing of the intake valve 11 and the exhaust valve 12 (see FIG. 2) (advanced opening of the intake valve 11 or retarded closing of the exhaust valve 12), and an external EGR to flow back the exhaust gas via the EGR passage 51. Thus, a target internal EGR ratio and a target external EGR ratio are set in step S21. Then, a target intake valve open/close timing at which the intake valve 11 is opened or closed and a target exhaust valve open/close timing at which the exhaust valve 12 is opened or closed are set to achieve the target internal EGR ratio, and a target EGR valve open percent which is an open percent of the EGR valve 53 is set to achieve the target external EGR ratio (step S22).

The ECU 60 then sets a target throttle open percent which is an open percent of the throttle valve 32 to achieve the target amount of air, a target bypass valve open percent which is an open percent of the bypass valve 39 on the bypass passage 38, and a target clutch coupling percent which indicates a degree of coupling between the supercharger 33 and the electromagnetic clutch 34 (step S23). The ECU 60 sends operational commands to actuators provided to the components to be controlled to achieve the targets, which are the target throttle open percent, the target intake valve open/close timing, the target exhaust valve open/close timing, the target bypass valve open percent, the target EGR valve open percent, and the target clutch coupling percent (step S24). That is, the actuators are operated according to the target values to create the spark ignition controlled compression ignition combustion set in step S18.

Then, according to actual responsiveness of combustion regarding the target values, a correcting process is performed on the amount of injected fuel and the injection timing of the injector 15 and the ignition timing of the ignition plug 16 (steps S25 to S29). The valves operated by the actuators are devices having relatively poor responsiveness and do not move quickly to achieve the target value. The operating delay of the devices has an effect on, for example, achieving the target air-fuel ratio. The ECU 60 recognizes a deviation of the actual combustion state from the target combustion state due to the operating delay. To correct the deviation, the ECU 60 corrects the amount of injected fuel and the injection timing of the injector 15 which has high responsiveness and the ignition timing of the ignition plug 16 which has high responsiveness as well according to the state of the internal gas actually formed in the combustion chamber 6.

Specifically, the ECU 60 calculates the cylinder internal temperature, a charged amount of intake air, and an oxygen concentration in the cylinder 2 at a timing when the intake valve actually closes (step S25). In this calculation, state quantities of the actual intake gas, state quantities of the actual internal gas in the cylinder 2, and a result of the previous combustion are referred. The state quantities of the actual intake gas are derived from values including a detected value of the airflow sensor SN4, the first and second intake air temperature sensors SN5 and SN7, and the external EGR ratio. The state quantities of the actual internal gas are derived from values including values detected by the intake cam angle sensor SN12 and the exhaust cam angle sensor SN13. The result of the previous combustion includes a self-ignition timing obtained from an actual waveform of the pressure in the cylinder derived from the detected value of the cylinder internal pressure sensor SN3.

Based on the charged amount of intake air and the oxygen concentration obtained in step S25, the ECU 60 sets the target amount of injected fuel and the target injection timing of the injector 15 so as to create the target air-fuel ratio set in step S18 (step S26). As illustrated in the charts (a) and (b) in FIG. 5, fuel injection is performed two times in each of the first air-fuel ratio mode ($\lambda$>1) and the second air-fuel ratio mode ($\lambda$=1) of the spark ignition controlled compression ignition combustion. The ECU 60 determines the amount and the timing for each of the first fuel injection and the second fuel injection to create the target air-fuel ratio. The ECU 60 sends a command to the injector 15 to achieve the target amount of injected fuel and the target injection timing (step S27).

The ECU 60 then sets the target ignition timing of the ignition plug 16 based on the internal temperature in the cylinder 2 at a timing when the intake valve actually closes (step S28). The target ignition timing is set to start the CI combustion at the target self-ignition timing set in step S18 by correcting the target ignition timing set in the same step S18. The ECU 60 operates the ignition plug 16 so as to ignite the mixed gas at the corrected target ignition timing (step S29).

In contrast, if it is determined that the SI ratio is not below 100% in step S20, that is, if the target combustion mode is the SI combustion (first combustion mode) (NO in step S20), the ECU 60 sets, according to the target amount of air set in step S18 values including the target throttle valve open percent, a target intake valve open/close timing, the target exhaust valve open/close timing, the target bypass valve open percent, the target clutch coupling percent, and the target EGR valve open percent (step S30). Based on the target amount of air and the target combustion pressure set in the same step S18, the ECU 60 sets the target amount of injected fuel and the target injection timing of the injector 15 and the target ignition timing of the ignition plug 16 (step S31). The ECU 60 operates the actuators, the injector 15, and the ignition plug 16 to achieve the target value (step S32).

<Mode Switching Control: Switching from $\lambda$=1 to Lean Condition>

Figure 14:
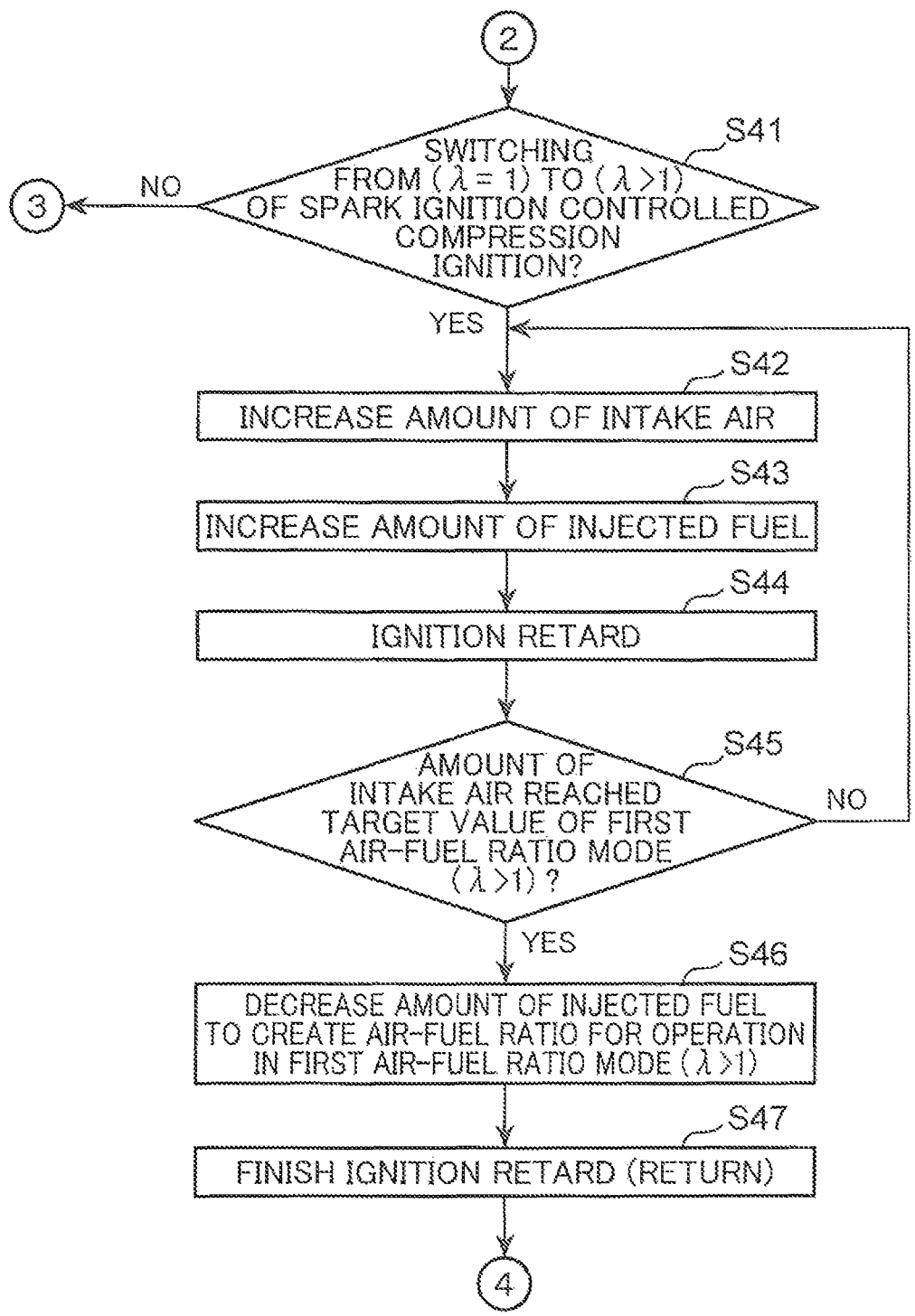
FIG. 14 is a flowchart illustrating a detail on the engine controlling process.
Figure 17:
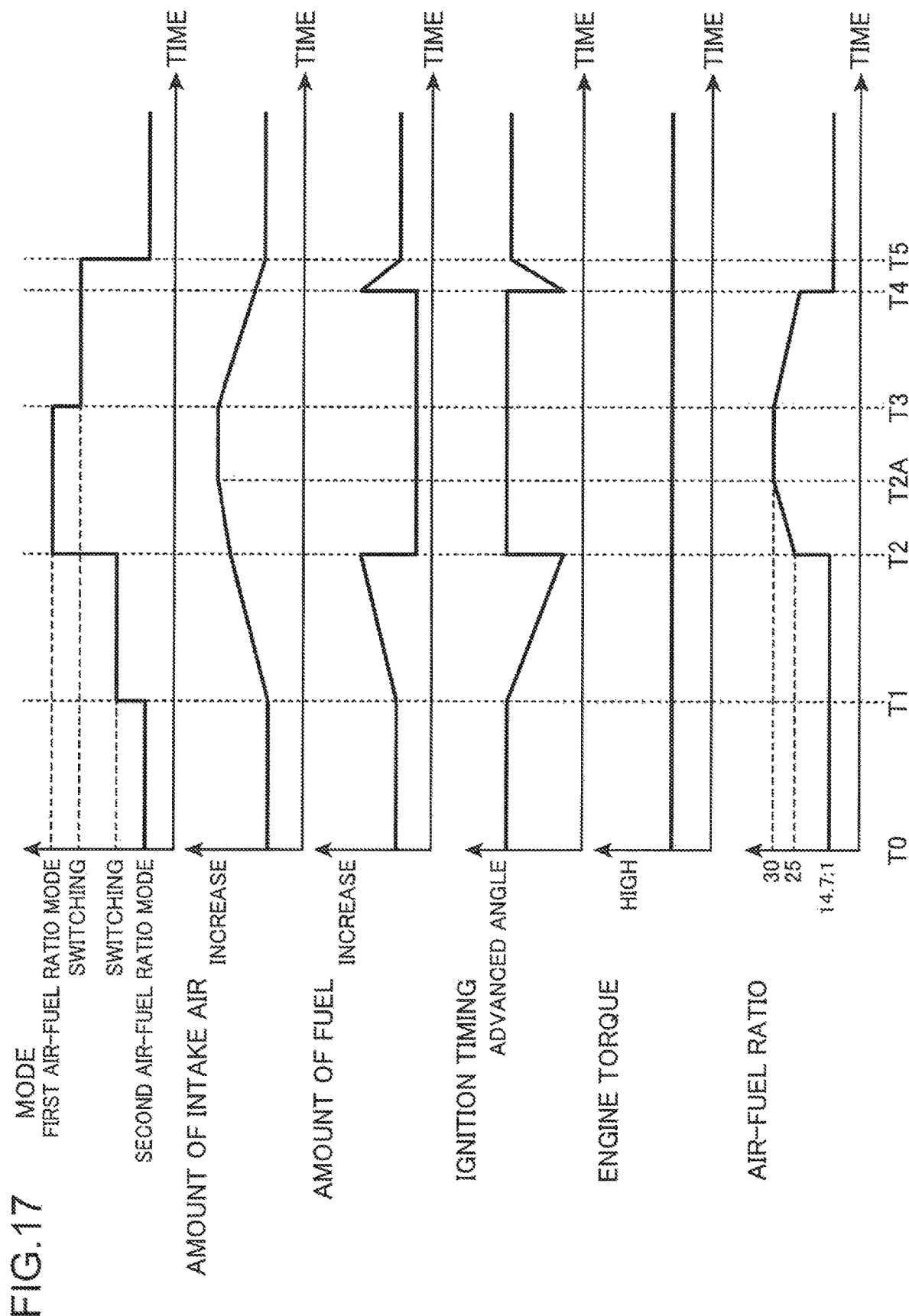
FIG. 17 is a timing chart illustrating mode switching between a first air-fuel ratio mode ($\lambda>1$) and a second air-fuel ratio mode ($\lambda=1$).

Now, a constant torque mode switching control (step of setting air-fuel ratio mode) performed in step S15 when mode switching between the first air-fuel ratio mode ($\lambda$>1) and the second air-fuel ratio mode ($\lambda$=1) of the spark ignition controlled compression ignition combustion is requested will be described. FIG. 14 is a flowchart illustrating a mode switching control where mode switching from the second air-fuel ratio mode to the first air-fuel ratio mode is requested. FIG. 17 is a timing chart illustrating the relationship among the mode switching, the amount of intake air, the amount of fuel, the ignition timing, the engine torque, and the air-fuel ratio.

When the mode switching is requested in step S15 illustrated in FIG. 12 (NO in step S15), the process proceeds to step S41 in FIG. 14. The ECU 60 (determining unit 63) determines whether the requested mode switching is switching from the second air-fuel ratio mode to the first air-fuel ratio mode, that is, whether the requested mode switching is switching of the mode of the spark ignition controlled compression ignition combustion from $\lambda$=1 to a lean condition (step S41). If the request is switching from the second air-fuel ratio mode to the first air-fuel ratio mode (YES in step S41), the determining unit 63 commands the combustion control unit 61 to change the air-fuel ratio A/F from $\lambda$=1 to a lean condition without degrading emission and perform a control of keeping the engine torque constant during the mode switching.

Specifically, the ECU 60 (combustion control unit 61) adjusts the open percent of the throttle valve 32 to increase the amount of intake air (step S42) and increases the amount of fuel jetted from the injector 15 (step S43). With reference to FIG. 17, the second air-fuel ratio mode is performed in a period from time T0 to T1, and the mode switching from the second air-fuel ratio mode to the first air-fuel ratio mode is performed in a period from time T1 to T2. The amount of intake air and the amount of fuel, which are given to create the first air-fuel ratio mode ($\lambda>1$) in the period from time T0 to T1, are proportionally increased in the period from time T1 to T2 by the ECU 60 as illustrated in the chart (step of increasing intake air and step of increasing fuel). While the amount of intake air is gradually increased to create a leaner state, the amount of fuel is gradually increased in this period to avoid creating an air-fuel ratio that produces NOx.

In parallel to this, the ECU 60 retards the ignition timing of the ignition plug 16 in the period from time T1 to T2 (step S44). This suppresses the engine torque increasing by the increase in the amount of fuel in the period from time T1 to T2 (first retard step). The retard of the ignition timing is performed so as the ignition timing to gradually be retarded along with the gradual increase in the amount of fuel. The reduced engine torque by the ignition retard cancels the effect by the increase in the amount of fuel, and thereby the torque is kept constant in the period from time T1 to T2.

The ECU 60 checks whether the amount of intake air has reached the target value set for the first air-fuel ratio mode ($\lambda>1$) (step S45). An air-fuel ratio that substantially does not produce NOx can be created with the target value of the amount of intake air. In the embodiment, the air-fuel ratio A/F=25/1 is the rich limit for not producing NOx in the first mode lean combustion. The air-fuel ratio A/F=30/1 is a predetermined air-fuel ratio for the first air-fuel ratio mode. In step S45, whether the air-fuel ratio has reached 25 is determined. If not reached (NO in step S45), steps S42 to S44 are repeated. That is, the amount of intake air and the amount of fuel are further increased and the ignition timing is further retarded.

Meanwhile, if the amount of intake air has reached a value to create the air-fuel ratio of 25 (YES in step S45), the ECU 60 steeply decreases the amount of fuel to an amount necessary to create the lean mixed gas for the first air-fuel ratio mode (step S46). A steep reduction occurs at time T2 in the timing chart in FIG. 17. This creates the mixed gas having the air-fuel ratio that creates the first air-fuel ratio mode ($\lambda>1$) but does not produce NOx in the combustion chamber 6. The operation of torque reduction is not needed at this timing, so the ECU 60 finishes the ignition retard (step S47). The amount of intake air is still increased after time T2. That is, the amount of intake air is increased until time T2A when the amount of intake air reaches such an amount that creates a predetermined air-fuel ratio of 30.

<Mode Switching Control: Switching from Lean Condition to $\lambda=1$>

Figure 15:
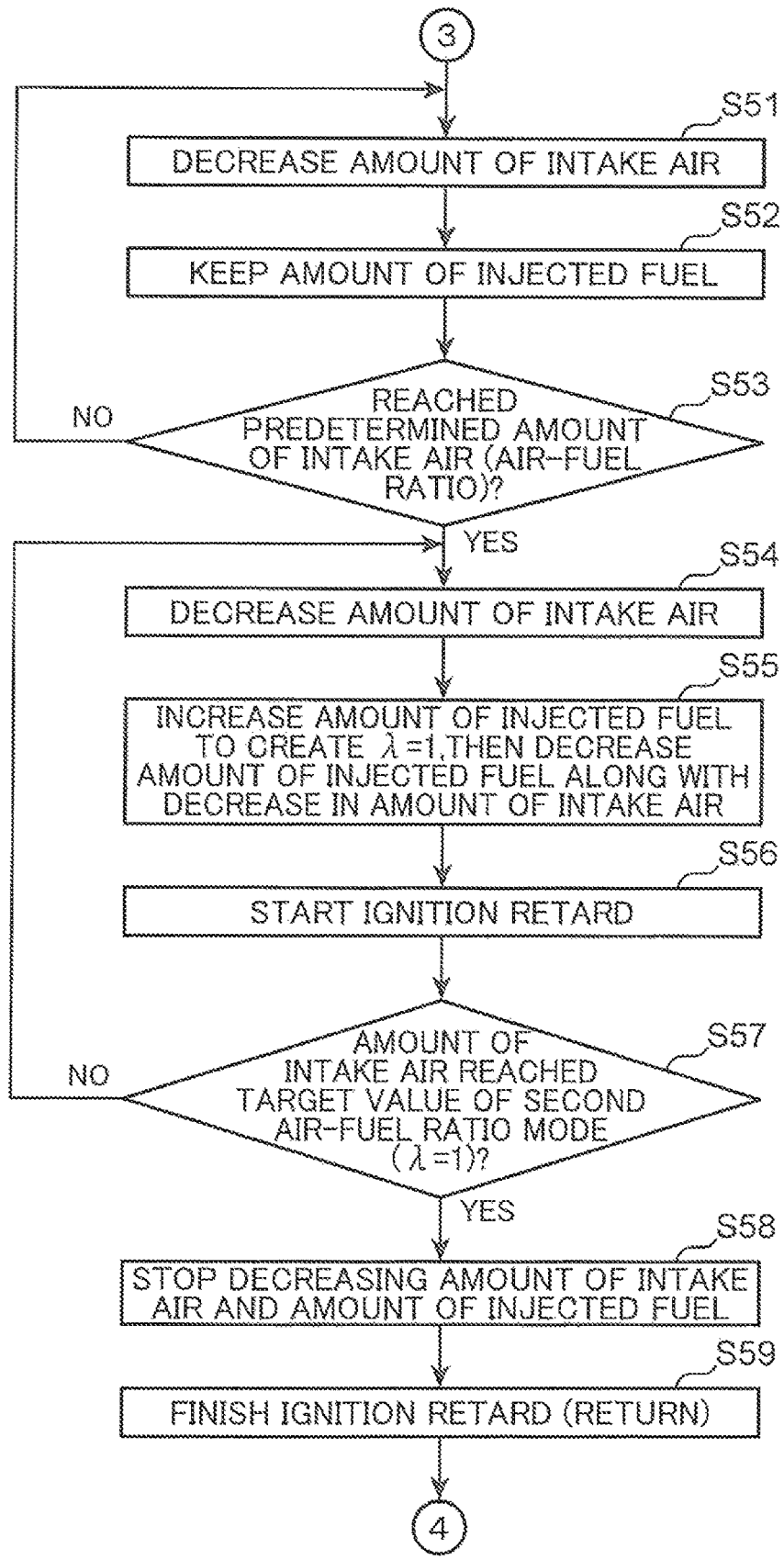
FIG. 15 is a flowchart illustrating a detail on the engine controlling process.

With reference to FIGS. 15 and 17, a constant torque mode switching control performed when switching from the first air-fuel ratio mode ($\lambda>1$) to the second air-fuel ratio mode ($\lambda=1$) is requested will now be described. FIG. 15 is a flowchart illustrating a mode switching control when the mode switching from the first air-fuel ratio mode to the second air-fuel ratio mode is requested.

In step S41 in FIG. 14, if the requested mode switching is not switching from the second air-fuel ratio mode to the first air-fuel ratio mode (NO in step S41), the process proceeds to step S51 in FIG. 15. In this case, the determining unit 63 of the ECU 60 commands the combustion control unit 61 to perform in a control of changing the air-fuel ratio A/F from a lean condition to $\lambda=1$ without degrading emission and keeping the engine torque constant during the mode switching.

Specifically, the ECU 60 (combustion control unit 61) adjusts the open percent of the throttle valve 32 to decrease the amount of intake air (step of decreasing intake air; step S51). Meanwhile, the amount of fuel jetted from the injector 15 is maintained (step S52). With reference to FIG. 17, the first air-fuel ratio mode is performed in a period from time T2 to T3, and the mode switching from the first air-fuel ratio mode to the second air-fuel ratio mode is performed in a period from time T3 to T5. The amount of intake air given to create the first air-fuel ratio mode ($\lambda>1$) in a period from time T2A to T3 is increased in a period from time T3 to T4 by the ECU 60 as illustrated in the chart. Meanwhile, the amount of injected fuel in the period from T3 to T4 is the same as that in the period from time T2A to T3.

The ECU 60 checks whether the amount of intake air has reached a predetermined decreased amount of intake air (air-fuel ratio) (step S53). The decreased amount of intake air creates the air-fuel ratio A/F=25/1, which is the rich limit for not producing NOx in the lean combustion in the first air-fuel ratio mode. If the air-fuel ratio does not reach 25 (NO in step S53), the process returns to step S51 and the amount of intake air is further decreased.

In contrast, if the air-fuel ratio reaches 25 at time T4 (YES in step S53), a control to prevent production of NOx is performed. Specifically, while continuing decreasing of the amount of intake air (step S54), the ECU 60 steeply increases the amount of fuel jetted by the injector 15 to create a mixed gas having the air-fuel ratio of 14.7 ($\lambda=1$) with the amount of intake air at the time T4 (step S55). After time T4, the amount of injected fuel is decreased along with the decrease in the amount of intake air to keep $\lambda=1$. This avoids creating an air-fuel ratio that produces NOx. Likewise in step S44 described above, the ECU 60 steeply retards the ignition timing of the ignition plug 16 according to the amount of intake air and the amount of injected fuel at time T4 to cancel the increase in the engine torque caused by the increase in the amount of fuel (second retard step) (step S56). This prevents the change in torque before and after time T4.

The ECU 60 checks whether the amount of intake air has reached the target value set for the second air-fuel ratio mode ($\lambda=1$) (step S57). That is, at time T4 when the air-fuel ratio has been reduced to 14.7, whether the amount of intake air has decreased to such an amount that the second air-fuel ratio mode can be performed is checked. If the target value has not yet been reached (NO in step S57), steps S54 to S56 are repeated. That is, the amount of intake air and the amount of fuel are further decreased and the retard of the ignition timing is gradually decreased. This keeps the torque constant in the period from time T4 to T5.

Meanwhile, if the amount of intake air reaches the amount for the second air-fuel ratio mode ($\lambda=1$) (YES in step S57), the ECU 60 stops decreasing the amount of intake air and the amount of injected fuel (step S58). The stopping is done at time T5 in the timing chart in FIG. 17. Now, the mixed gas of $\lambda=1$ with the amount of intake air for the second air-fuel ratio mode is created in the combustion chamber 6. The ECU 60 finishes the ignition retard at time T5 (step S59). At a timing just before time T5, the torque reduction by the ignition retard becomes the smallest. After finishing step S47 in FIG. 14 or step S59 in FIG. 15 described above, the process proceeds to "RETURN" in FIG. 13, that is, returns to step S11 in FIG. 12 and repeats the same process.

Exemplary Modification

The embodiment of the present invention is described above. The scope of the present invention is not limited to the embodiment. Various exemplary modifications as illustrated below can be made.

(1) In the embodiment, the FF vehicle 100 is described as an exemplary vehicle. The engine control method and the engine system according to the present invention can be applied to an FR vehicle, a four-wheel drive vehicle, and a hybrid vehicle that has a motor driven by electric power supplied from a battery or a capacitor and an engine as driving sources.

(2) The exemplary control illustrated in FIG. 10C prioritizes the vehicle attitude control, and the switching of the air-fuel ratio mode between the first air-fuel ratio mode and the second air-fuel ratio mode of the spark ignition controlled compression ignition combustion is disallowed when the vehicle attitude control is being performed. Alternatively, the mode switching may be suppressed (disallowed) when the mode switching is performed more than predetermined times in a unit time (step of determining switching times). In other words, if the number of times the switching of the air-fuel ratio mode is performed is not likely to cause hunting, namely, small enough not to cause instable combustion, the switching of the air-fuel ratio mode may be performed even when the vehicle attitude control is being performed.

Figure 18:
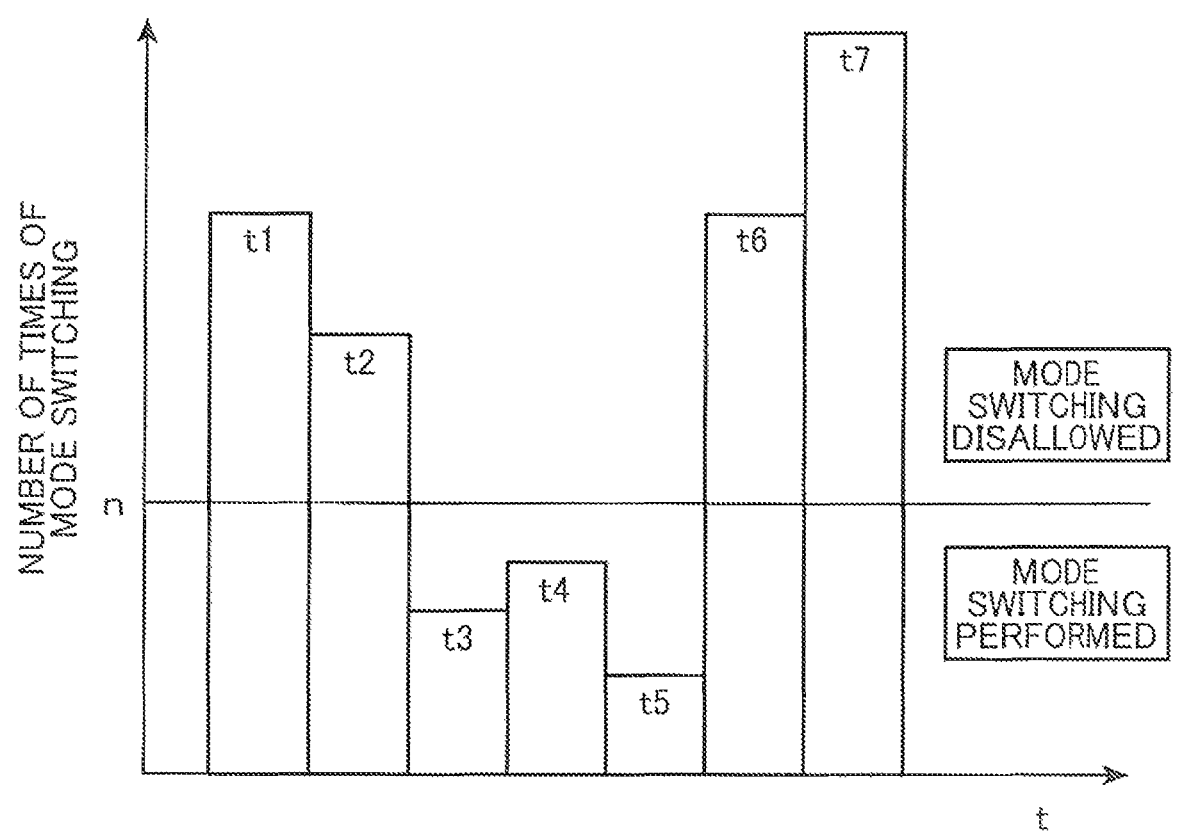
FIG. 18 is a chart for explaining an exemplary determination of allowing or disallowing mode switching of the spark ignition controlled compression ignition combustion.

FIG. 18 is a chart for explaining an exemplary determination of allowing or disallowing the switching of the air-fuel ratio mode of the spark ignition controlled compression ignition combustion. In the figure, t1 to t7 each indicates the number of switching of the air-fuel ratio mode of the spark ignition controlled compression ignition combustion in a unit time. A horizontal line appended with n indicates a threshold for performing or disallowing the switching of the air-fuel ratio mode. The determining unit 63 determines that, for the unit times t3, t4, and t5 where the number of requesting the mode switching is below the threshold n, the mode switching is allowed even when the vehicle attitude control is being performed. Meanwhile, for the unit times t1, t2, t6, and t7 where the number of requesting the mode switching exceeds the threshold n, performing the mode switching is disallowed.

Instable combustion is caused by such a frequent switching of the air-fuel ratio mode that is equivalent to hunting, so that the switching of the air-fuel ratio mode not frequent enough to cause hunting is allowed. According to the exemplary modification, suppressing (disallowing) the switching of the air-fuel ratio mode can be restricted to be performed only when inevitably needed. This suppresses diminishing of the advantage of the switching of the air-fuel ratio mode. The threshold n given for the number of times the switching of the air-fuel ratio mode is performed can be set to about, for example, several times to 10 times per one minute.

(3) In the control in which the vehicle attitude control is prioritized as illustrated in FIG. 10C, the mode switching may be suppressed by delaying the mode switching until, for example, the vehicle attitude control finishes or the timing the one vehicle attitude control and another instead of totally disallowing the mode switching.

(4) In the timing chart in FIG. 17, an example in which the engine torque is kept at a "constant torque" in the mode switching period (from time T1 to T2 and from T3 to T5 in FIG. 17) is described. The "constant torque" does not mean that not a slight change in the torque is allowed. The torque may change within such a range that the torque can be regarded substantially constant.

(5) In the embodiment described above, an example in which the torque reduction for the vehicle attitude control is totally switched to the fuel amount decreasing control with no ignition retard when the spark ignition controlled compression ignition combustion (example in FIG. 10A) or the spark ignition controlled compression ignition combustion in the first air-fuel ratio mode (example in FIGS. 10B and 12 to 15) is performed. Alternatively, a portion of the torque reduction necessary for the vehicle attitude control may be performed by the ignition retard (control of suppressing the level of ignition retard) and the rest of the torque reduction by the fuel amount decreasing control.

(6) FIGS. 10C and 12 illustrate an example where determination on the switching of the air-fuel ratio mode is made based on the target basic engine torque to which the torque reduction for the vehicle attitude control is not yet applied, which leads to prevention of hunting by the switching of the air-fuel ratio mode. As an exemplary modification, a control may be performed based on the target final engine torque to which the torque reduction for the vehicle attitude control has been applied (step S16 in FIG. 12). FIG. 19 is a flowchart schematically illustrating the exemplary modification.

The ECU 60 reads signals from the sensors provided in the vehicle 100 (step S61). The determining unit 63 then determines, based on the target final engine torque, whether the air-fuel ratio mode is to be switched (in a state where mode switching is requested) between the first air-fuel ratio mode ($\lambda>1$) and the second air-fuel ratio mode ($\lambda\leq1$) (step S62). The determining unit 63 then determines whether the torque reduction amount for the vehicle attitude control is set (step S63). If the torque reduction amount is set (YES in step S63; if the torque reduction amount is set in the step of setting torque reduction), the determining unit 63 suppresses (disallows) switching of the air-fuel ratio mode (step S64). Meanwhile, if the torque reduction amount is not set (NO in step S63), the determining unit 63 performs switching of the air-fuel ratio mode (step S65).

Invention Included in Embodiment

The specific embodiments described above mainly include the following inventions.

An engine control method according to one aspect of the present invention is a method for controlling an engine that is mounted on a vehicle including a steering wheel and mechanically coupled to a driving wheel of the vehicle, and includes an ignition plug, the method including a step of setting combustion mode in which a combustion mode of the engine is selected among a first combustion mode and a second combustion mode based on an operating condition of the engine, the first combustion mode being a mode in which an entire mixed gas in a cylinder of the engine is combusted by propagating flame generated by the ignition plug, the second combustion mode being a mode in which at least a portion of the mixed gas in the cylinder is combusted by self-ignition, a step of setting air-fuel ratio mode in which, when the second combustion mode is selected in the step of setting combustion mode, an air-fuel ratio mode is selected among a first air-fuel ratio mode and a second air-fuel ratio mode based on the operating condition of the engine, the first air-fuel ratio mode being a mode in which the mixed gas is leaner than a theoretical air-fuel ratio, the second air-fuel ratio mode being a mode in which the mixed gas is equal to or richer than the theoretical air-fuel ratio, a switching step in which switching of the air-fuel ratio mode is performed based on the air-fuel ratio mode selected in the step of setting air-fuel ratio mode, a step of setting torque reduction in which a torque reduction amount by which a torque generated by the engine is reduced is set based on a steer angle of the steering wheel, and a suppressing step in which the switching of the air-fuel ratio mode caused by reducing the generated torque is suppressed when the torque reduction amount is set in the step of setting torque reduction.

A vehicle system according to another aspect of the present invention is an engine system including an engine that is mounted on a vehicle including a steering wheel and mechanically coupled to a driving wheel of the vehicle, and includes an ignition plug, an operating condition sensor that detects an operating condition of the engine, a steer angle sensor that detects a steer angle of the steering wheel, and a control unit. The control unit selects a combustion mode of the engine among a first combustion mode and a second combustion mode based on a detected result by the operating condition sensor, the first combustion mode being a mode in which an entire mixed gas in a cylinder of the engine is combusted by propagating flame generated by the ignition plug, the second combustion mode being a mode in which at least a portion of the mixed gas in the cylinder is combusted by self-ignition, selects an air-fuel ratio mode, when the second combustion mode is selected as the combustion mode of the engine, among a first air-fuel ratio mode and a second air-fuel ratio mode based on the operating condition of the engine, the first air-fuel ratio mode being a mode in which the mixed gas is leaner than a theoretical air-fuel ratio, the second air-fuel ratio mode being a mode in which the mixed gas is equal to or richer than the theoretical air-fuel ratio, switches the air-fuel ratio mode based on the selected air-fuel ratio mode, sets a torque reduction amount by which a torque generated by the engine is reduced based on a detected result by the steer angle sensor, and suppresses, when the torque reduction amount is set, switching of the air-fuel ratio mode caused by reducing the generated torque.

According to the engine control method and the engine system, the torque reduction amount is set based on the steer angle of the steering wheel. This corresponds to the vehicle attitude control. The first combustion mode corresponds to the SI combustion, and the second combustion mode corresponds to the spark ignition controlled compression ignition combustion. When the torque reduction amount is set in the step of setting torque reduction, switching of the air-fuel ratio mode is suppressed even if the condition for the mode switching between the first air-fuel ratio mode and the second air-fuel ratio mode is satisfied.

That is, when the vehicle attitude control is being performed, the switching of the air-fuel ratio mode of the spark ignition controlled compression ignition combustion is suppressed even if the condition for the switching of the air-fuel ratio mode is satisfied. When the vehicle attitude control is performed, a cycle of reducing the engine torque and returning the engine torque to the requested torque is repeated, whereas the switching of the air-fuel ratio mode of the spark ignition controlled compression ignition combustion is performed depending mainly on the engine load (torque) and the rotational speed. Thus, performing the vehicle attitude control might cause hunting in which the mode switching of the spark ignition controlled compression ignition combustion frequently happens. According to the configuration, the switching of the air-fuel ratio mode is suppressed when the vehicle attitude control is being performed, so that the hunting is suppressed and instable combustion can be prevented.

In the engine control method, it is preferable that, in the step of setting air-fuel ratio mode, the air-fuel ratio mode is selected based on the requested torque to which the reduction in the generated torque based on the torque reduction amount set in the step of setting torque reduction is not yet applied.

As described above, fluctuation of the engine torque increases when the vehicle attitude control is performed. When determination on the switching of the air-fuel ratio mode is made based on the generated torque to which the torque reduction amount for the vehicle attitude control is applied, determination on whether the condition for the switching of the air-fuel ratio mode is satisfied may not be made correctly. According to the engine control method, the air-fuel ratio mode is selected in the step of setting air-fuel ratio mode based on the requested torque, which is the generated torque to which torque reduction based on the torque reduction amount is not yet applied, that is, the requested torque to which the torque reduction for the vehicle attitude control is not yet applied. Thus, the selection can be made correctly.

It is preferable that the engine control method further includes a step of determining switching times in which whether the switching of the air-fuel ratio mode has been made predetermined times or more per a unit time, and if it is determined in the step of determining switching times that the switching of the air-fuel ratio mode has been made the predetermined times or more per a unit time, the switching of the air-fuel ratio mode is suppressed in the suppressing step.

Instable combustion is caused by such a frequent mode switching that is equivalent to hunting, so that the mode switching not frequent enough to cause hunting is allowed. According to the engine control method, whether to suppress the switching of the air-fuel ratio mode is determined based on the number of times the switching of the air-fuel ratio mode is performed per a unit time. Thus, the switching of the air-fuel ratio mode is restricted to be performed only when inevitably needed. This suppresses diminishing of the advantage of the switching of the air-fuel ratio mode.

In the engine control method, the engine preferably includes a fuel injection valve, and the engine control method preferably includes a step of increasing intake air in which an amount of intake air into the cylinder is increased when switching from the second air-fuel ratio mode to the first air-fuel ratio mode is being performed, a step of increasing fuel in which the fuel injection valve is controlled to increase an amount of fuel supplied into the cylinder along with an increase in the amount of intake air in the step of increasing intake air, and a first retard step in which an ignition timing of the ignition plug is retarded according to an increase in the amount of intake air to keep the torque generated by the engine constant in the step of increasing intake air.

According to the engine control method, the amount of fuel is increased along with the increase in the amount of intake air when the second air-fuel ratio mode is switched to the first air-fuel ratio mode. Production of NOx can thus be suppressed. In addition, while switching the air-fuel ratio mode, the ignition timing of the ignition plug is retarded in the first retard step to suppress the change in the torque caused by the increase in the amount of intake air and the amount of fuel. The driving performance during the switching of the air-fuel ratio mode can thus be stabilized.

The engine control method preferably includes a step of decreasing intake air in which an amount of intake air into the cylinder is decreased when switching from the first air-fuel ratio mode to the second air-fuel ratio mode is being performed, and a second retard step in which an ignition timing of the ignition plug is retarded according to the decrease in the amount of intake air to keep the torque generated by the engine constant in the step of increasing intake air.

According to the engine control method, the change in the torque is suppressed when the switching of the air-fuel ratio mode is being performed in the second retard step, so that the driving performance during the switching of the air-fuel ratio mode can be stabilized.

In the engine control method, the reduction in the torque generated by the engine is preferably made by retarding the ignition timing of the ignition plug. According to the engine control method, the vehicle attitude control can be performed by retarding the ignition timing of the ignition plug, which is a relatively easy control.

In the engine control method, an air-fuel ratio range not belonging to either a first air-fuel ratio range of a mixed gas formed in the first air-fuel ratio mode or a second air-fuel ratio range of a mixed gas formed in the second air-fuel ratio mode exists between the first air-fuel ratio range and the second air-fuel ratio range.

When there is the air-fuel ratio range between and not belonging to the air-fuel ratio range of the first air-fuel ratio mode and the air-fuel ratio range of the second air-fuel ratio mode, the switching of the air-fuel ratio mode, in which the amount of intake air and the amount of fuel change, cannot be made in an instant but needs a certain time. Thus, if the reduction control on the engine torque for the vehicle attitude control is overlapped when such switching of the air-fuel ratio mode is being performed, the combustion is likely to become instable. Accordingly, in such a case, in particular, the features of the present invention described above are useful.

According to the present invention described above, an engine control method that can suppress happening of a frequent change in the air-fuel ratio mode in an engine that performs both the spark ignition controlled compression ignition combustion in which the air-fuel ratio mode of the mixed gas is switched between $\lambda>1$ and $\lambda \leq 1$ and the vehicle attitude control, and an engine system to which the control method is applied.

The invention claimed is:

1. An engine control method for controlling an engine that is mounted on a vehicle including a steering wheel and mechanically coupled to a driving wheel of the vehicle, and includes an ignition plug, the method comprising:
    a step of setting combustion mode in which a combustion mode of the engine is selected among a first combustion mode and a second combustion mode based on an operating condition of the engine, the first combustion mode being a mode in which an entire mixed gas in a cylinder of the engine is combusted by propagating flame generated by the ignition plug, the second combustion mode being a mode in which at least a portion of the mixed gas in the cylinder is combusted by self-ignition;
    a step of setting air-fuel ratio mode in which, when the second combustion mode is selected in the step of setting combustion mode, an air-fuel ratio mode is selected among a first air-fuel ratio mode and a second air-fuel ratio mode based on the operating condition of the engine, the first air-fuel ratio mode being a mode in which the mixed gas is leaner than a theoretical air-fuel ratio, the second air-fuel ratio mode being a mode in which the mixed gas is equal to or richer than the theoretical air-fuel ratio;
    a switching step in which switching of the air-fuel ratio mode is performed based on the air-fuel ratio mode selected in the step of setting air-fuel ratio mode;
    a step of setting torque reduction in which a torque reduction amount by which a torque generated by the engine is reduced is set based on a steer angle of the steering wheel;
    a suppressing step in which the switching of the air-fuel ratio mode caused by reducing the generated torque is suppressed when the torque reduction amount is set in the step of setting torque reduction; and
    a step of determining whether the switching of the air-fuel ratio mode has been made predetermined times or more per a unit time, wherein
    if it is determined that the switching of the air-fuel ratio mode has been made the predetermined times or more per a unit time, the switching of the air-fuel ratio mode is suppressed in the suppressing step.

2. The engine control method according to claim 1, wherein
    in the step of setting air-fuel ratio mode, the air-fuel ratio mode is selected based on a requested torque to which reduction in the generated torque based on the torque reduction amount set in the step of setting torque reduction is not yet applied.

3. The engine control method according to claim 1, the engine including a fuel injection valve, further comprising:
    a step of increasing intake air in which an amount of intake air into the cylinder is increased when switching from the second air-fuel ratio mode to the first air-fuel ratio mode is being performed,
    a step of increasing fuel in which the fuel injection valve is controlled to increase an amount of fuel supplied into the cylinder along with an increase in the amount of intake air in the step of increasing intake air, and
    a first retard step in which an ignition timing of the ignition plug is retarded according to an increase in the amount of intake air to keep the torque generated by the engine constant in the step of increasing intake air.

4. The engine control method according to claim 1, further comprising:
    a step of decreasing intake air in which an amount of intake air into the cylinder is decreased when switching from the first air-fuel ratio mode to the second air-fuel ratio mode is being performed, and
    a second retard step in which an ignition timing of the ignition plug is retarded according to the decrease in the amount of intake air to keep the torque generated by the engine constant in the step of decreasing intake air.

5. The engine control method according to claim 1, wherein
    the reduction in the torque generated by the engine is made by retarding an ignition timing of the ignition plug.

6. The engine control method according to claim 1, wherein
    an air-fuel ratio range not belonging to either a first air-fuel ratio range of a mixed gas formed in the first air-fuel ratio mode or a second air-fuel ratio range of the mixed gas formed in the second air-fuel ratio mode exists between the first air-fuel ratio range and the second air-fuel ratio range.

7. An engine system comprising:
an engine that is mounted on a vehicle including a steering wheel and mechanically coupled to a driving wheel of the vehicle, and includes an ignition plug;
an operating condition sensor that detects an operating condition of the engine;
a steer angle sensor that detects a steer angle of the steering wheel; and
a control unit, wherein
the control unit
  selects a combustion mode of the engine among a first combustion mode and a second combustion mode based on a detected result by the operating condition sensor, the first combustion mode being a mode in which an entire mixed gas in a cylinder of the engine is combusted by propagating flame generated by the ignition plug, the second combustion mode being a mode in which at least a portion of the mixed gas in the cylinder is combusted by self-ignition,
  selects an air-fuel ratio mode, when the second combustion mode is selected as the combustion mode of the engine, among a first air-fuel ratio mode and a second air-fuel ratio mode based on the operating condition of the engine, the first air-fuel ratio mode being a mode in which the mixed gas is leaner than a theoretical air-fuel ratio, the second air-fuel ratio mode being a mode in which the mixed gas is equal to or richer than the theoretical air-fuel ratio,
  switches the air-fuel ratio mode based on the selected air-fuel ratio mode,
  sets a torque reduction amount by which a torque generated by the engine is reduced based on a detected result by the steer angle sensor,
  suppresses, when the torque reduction amount is set, switching of the air-fuel ratio mode caused by reducing the generated torque,
  determines whether the switching of the air-fuel ratio mode has been made predetermined times or more per a unit time, and
  if it is determined that the switching of the air-fuel ratio mode has been made the predetermined times or more per a unit time, suppresses the switching of the air-fuel ratio mode.

8. The engine control method according to claim 2, the engine including a fuel injection valve, further comprising:
a step of increasing intake air in which an amount of intake air into the cylinder is increased when switching from the second air-fuel ratio mode to the first air-fuel ratio mode is being performed,
a step of increasing fuel in which the fuel injection valve is controlled to increase an amount of fuel supplied into the cylinder along with an increase in the amount of intake air in the step of increasing intake air, and
a first retard step in which an ignition timing of the ignition plug is retarded according to an increase in the amount of intake air to keep the torque generated by the engine constant in the step of increasing intake air.

9. The engine control method according to claim 2, further comprising:
a step of decreasing intake air in which an amount of intake air into the cylinder is decreased when switching from the first air-fuel ratio mode to the second air-fuel ratio mode is being performed, and
a second retard step in which an ignition timing of the ignition plug is retarded according to the decrease in the amount of intake air to keep the torque generated by the engine constant in the step of decreasing intake air.

10. The engine control method according to claim 3, further comprising:
a step of decreasing intake air in which an amount of intake air into the cylinder is decreased when switching from the first air-fuel ratio mode to the second air-fuel ratio mode is being performed, and
a second retard step in which an ignition timing of the ignition plug is retarded according to the decrease in the amount of intake air to keep the torque generated by the engine constant in the step of decreasing intake air.

11. The engine control method according to claim 2, wherein
the reduction in the torque generated by the engine is made by retarding an ignition timing of the ignition plug.

12. The engine control method according to claim 2, wherein
an air-fuel ratio range not belonging to either a first air-fuel ratio range of a mixed gas formed in the first air-fuel ratio mode or a second air-fuel ratio range of the mixed gas formed in the second air-fuel ratio mode exists between the first air-fuel ratio range and the second air-fuel ratio range.

* * * * *